US010675493B2

(12) United States Patent
Sandahl et al.

(10) Patent No.: US 10,675,493 B2
(45) Date of Patent: Jun. 9, 2020

(54) FIRE SUPPRESSION SYSTEMS AND METHODS

(71) Applicant: Tyco Fire Products LP, Lansdale, PA (US)

(72) Inventors: Derek M. Sandahl, Wallace, MI (US); Brian L. Counts, Menominee, MI (US); Marvin B. Fernstrum, Menominee, MI (US); Chad L. Ryczek, Oconto Falls, WI (US); Saul Escalante-Ortiz, Green Bay, WI (US); John T. Werth, Franklin, WI (US); Gregory J. Lilley, West Allis, WI (US); David R. Strehlow, Hales Corner, WI (US); Anthony J. Kreft, Langhorne, PA (US); Thomas John Myers, Wauwatosa, WI (US); John S. Bushert, Brookfield, WI (US); Richard J. Hackl, Greendale, WI (US); Marvin D. Thorell, Racine, WI (US)

(73) Assignee: Tyco Fire Products LP, Lansdale, PA (US)

(*) Notice: Subject to any disclaimer, the term of this patent is extended or adjusted under 35 U.S.C. 154(b) by 0 days.

(21) Appl. No.: 16/056,009

(22) Filed: Aug. 6, 2018

(65) Prior Publication Data
US 2018/0369625 A1 Dec. 27, 2018

Related U.S. Application Data

(63) Continuation of application No. 14/430,188, filed as application No. PCT/US2013/061219 on Sep. 23, (Continued)

(51) Int. Cl.
A62C 37/00 (2006.01)
G05B 15/02 (2006.01)
(Continued)

(52) U.S. Cl.
CPC ............ A62C 37/00 (2013.01); A62C 35/023 (2013.01); A62C 35/64 (2013.01); A62C 37/36 (2013.01);
(Continued)

(58) Field of Classification Search
None
See application file for complete search history.

(56) References Cited

U.S. PATENT DOCUMENTS 3,702,474 A    11/1972   Fink et al.
3,986,560 A *  10/1976   Heath ............... A62C 3/06
                                              169/61

(Continued)

FOREIGN PATENT DOCUMENTS

EP    2 343 105    7/2011
GB    2 020 971    11/1979
(Continued)

OTHER PUBLICATIONS

Ansul® A-1 01 Fire Suppression System, Models 1 O, 20, 30 and Models 50, 125, 250, Data/Specifications, 2010, Tyco Fire Suppression & Building Products, 4 pages.
(Continued)

Primary Examiner — Ramesh B Patel
(74) Attorney, Agent, or Firm — Foley & Lardner LLP

(57) ABSTRACT

A vehicle fire suppression system includes a centralized controller, a detecting circuit, a releasing circuit, and a processor in communication with a monitoring circuit. The detecting circuit is coupled to the centralized controller and configured to indicate a detection of a fire. The releasing circuit includes an actuating device coupled to the centralized controller through an output bus. The actuating device is coupled to a supply of fire fighting agent. The centralized controller is configured to activate the actuating device to
(Continued)

release the fire fighting agent to address the fire in response to the detection of the fire. The processor and the monitoring circuit are configured to determine if there is a fault in at least one of the detecting circuit and the releasing circuit.

20 Claims, 16 Drawing Sheets

Related U.S. Application Data 2013, now Pat. No. 10,039,945, and a continuation-in-part of application No. 29/449,818, filed on Mar. 15, 2013, now Pat. No. Des. 745,833.

(60) Provisional application No. 61/704,551, filed on Sep. 23, 2012, provisional application No. 61/794,105, filed on Mar. 15, 2013.

(51) Int. Cl.
  G05D 7/06 (2006.01)
  A62C 35/02 (2006.01)
  A62C 37/36 (2006.01)
  B60R 16/02 (2006.01)
  A62C 35/64 (2006.01)
  A62C 3/07 (2006.01)

(52) U.S. Cl.
  CPC ............ *B60R 16/02* (2013.01); *G05B 15/02* (2013.01); *G05D 7/0635* (2013.01); *A62C 3/07* (2013.01)

(56) References Cited

U.S. PATENT DOCUMENTS

| | | | | |
|---|---|---|---|---|
| 3,993,138 | A * | 11/1976 | Stevens | A62C 37/36 169/61 |
| 4,034,470 | A | 7/1977 | Patton et al. | |
| 4,281,717 | A * | 8/1981 | Williams | A62C 3/00 137/624.14 |
| 5,055,064 | A | 10/1991 | Imaizumi et al. | |
| 5,117,219 | A * | 5/1992 | Tice | H04Q 9/14 340/505 |
| 5,236,049 | A * | 8/1993 | Asselin | A62C 37/44 169/17 |
| 5,273,443 | A | 12/1993 | Frantz et al. | |
| 5,486,811 | A * | 1/1996 | Wehrle | G08B 17/00 340/522 |
| 5,793,293 | A | 8/1998 | Melamud et al. | |
| 6,288,637 | B1 * | 9/2001 | Thomas | G08B 17/00 340/10.1 |
| 6,418,752 | B2 * | 7/2002 | Kotliar | A62C 3/0221 169/45 |
| D598,312 | S | 8/2009 | Kreier et al. | |
| D630,115 | S | 1/2011 | Mizukami | |
| D630,537 | S | 1/2011 | Mizukami | |
| D630,538 | S | 1/2011 | Tokutake | |
| D699,613 | S | 2/2014 | Ke | |
| D745,833 | S * | 12/2015 | Counts | D10/106.95 |
| 2002/0036090 | A1 * | 3/2002 | Gil | A62C 37/12 169/60 |
| 2003/0150625 | A1 * | 8/2003 | Smith | A62C 3/07 169/56 |
| 2003/0158635 | A1 * | 8/2003 | Pillar | A62C 27/00 701/1 |
| 2004/0145372 | A1 | 7/2004 | Miyazaki | |
| 2004/0163827 | A1 * | 8/2004 | Privalov | A62C 3/0271 169/46 |
| 2005/0086863 | A1 | 4/2005 | Brutsche et al. | |
| 2007/0185625 | A1 * | 8/2007 | Pillar | A62C 27/00 701/1 |
| 2007/0256105 | A1 * | 11/2007 | Tabe | G08B 13/19697 725/78 |
| 2008/0215700 | A1 * | 9/2008 | Pillar | A62C 27/00 709/212 |
| 2008/0277125 | A1 * | 11/2008 | Wilkins | A62C 35/645 169/46 |
| 2010/0117840 | A1 | 5/2010 | Rutter et al. | |
| 2010/0237197 | A1 | 9/2010 | Rosenfield et al. | |
| 2010/0320021 | A1 * | 12/2010 | Rini | A62C 3/07 180/271 |
| 2011/0155397 | A1 * | 6/2011 | Icove | G01K 11/006 169/43 |
| 2011/0168416 | A1 * | 7/2011 | Frasure | A62C 37/04 169/61 |
| 2012/0132445 | A1 * | 5/2012 | Mallon | A62C 27/00 169/24 |
| 2014/0358455 | A1 | 12/2014 | Rogers | |
| 2015/0231431 | A1 * | 8/2015 | Sandahl | G05D 7/0635 700/283 |
| 2015/0251031 | A1 | 9/2015 | Sandahl et al. | |

FOREIGN PATENT DOCUMENTS

| | | |
|---|---|---|
| GB | 2 405 514 | 3/2005 |
| WO | WO-2011/161792 | 12/2011 |
| WO | WO-2012/021549 A1 | 2/2012 |
| WO | WO-2012/021552 | 2/2012 |
| WO | WO-2014/047579 A1 | 3/2014 |
| WO | WO-2014/047574 | 6/2014 |

OTHER PUBLICATIONS

Ansul® Automatic Fire Suppression System (AFSS) Data/Specifications, 2012, Tyco Fire Products LP, 4 pages.
Electronics—Tutorials, Signal Diodes, Electronics—Tutorials, http://www.electronics-tutorials.ws/diode/diode_4.html (Website, archive snapshot Jan. 21, 2009).
Extended European Search Report, European Patent Application No. 13839904.3 dated Apr. 11, 2016, 37 pages.
European Patent Application No. 13839904.3, filed Sep. 23, 2013, 331 pages.
U.S. Appl. No. 61/704,551, filed Sep. 23, 2012, 81 pages.
U.S. Appl. No. 61/794,105, filed Mar. 15, 2013, 103 pages.
International Search Report and Written Opinion, International Patent Application No. PCT/US2013/061219, filed Sep. 23, 2013, 15 pages.
On All Cylinders Staff, How to Diagnose Electrical Ground Issues, http://www.onallcylinders.com/2012/01/16/how-to-diagnose-electrical-ground-issues/ (Website), Jan. 16, 2012.
Safe Fire Detection Inc., Linear Heat Detection, Safe Fire Detection Inc. http://safefiredetection.com/products/linear-heat-detection/ (Website, archive snapshot May 6, 2012).
Wikipedia, Current Limiting, Wikimedia Foundation, http://en.wikipedia.org/wiki/Current.limiting (Website, archive snapshot Feb. 25, 2008).
Wikipedia, Voltage Divider, Wikimedia Foundation, http://en.wikipedia.org/wiki/Voltage_divider (Website, archive snapshot Aug. 1, 2012).
Honeywell, "Extinguishing Agent Release Module: Operation, Installation & Programming Manual", May 10, 2010, 36 pages.
International Search Report and Written Opinion for International Application No. PCT/US2013/061214, dated Apr. 11, 2014, 19 pages.

\* cited by examiner

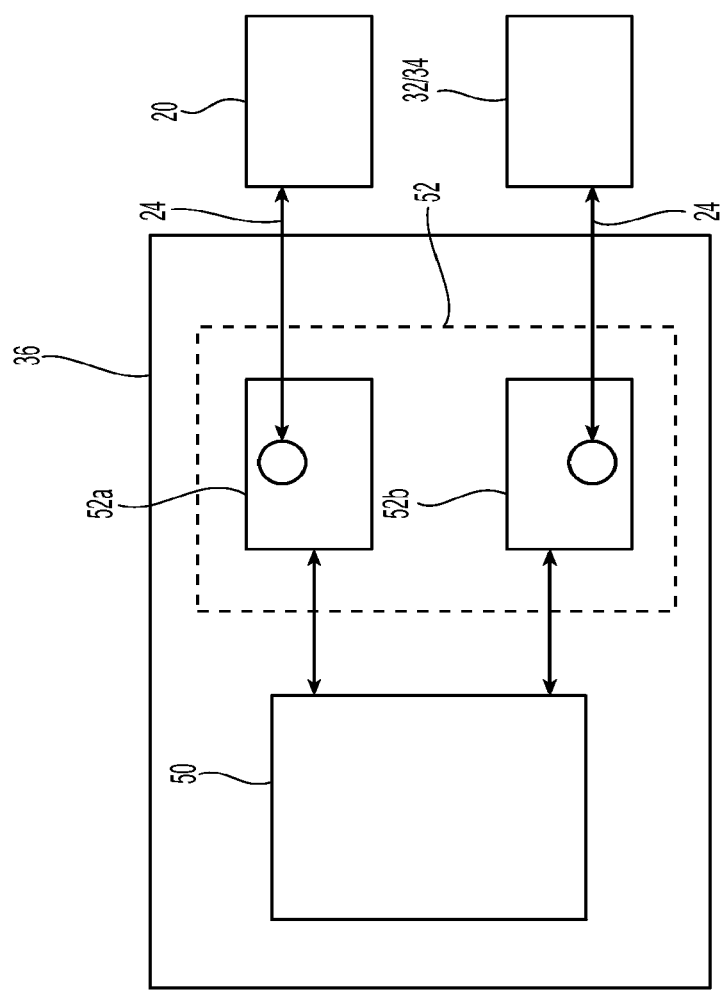

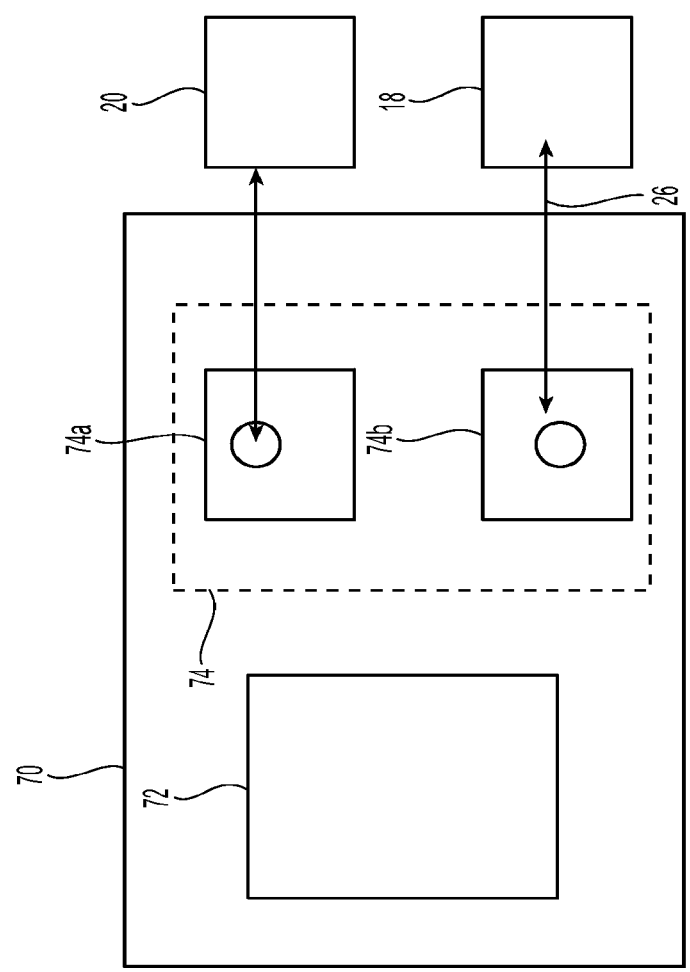

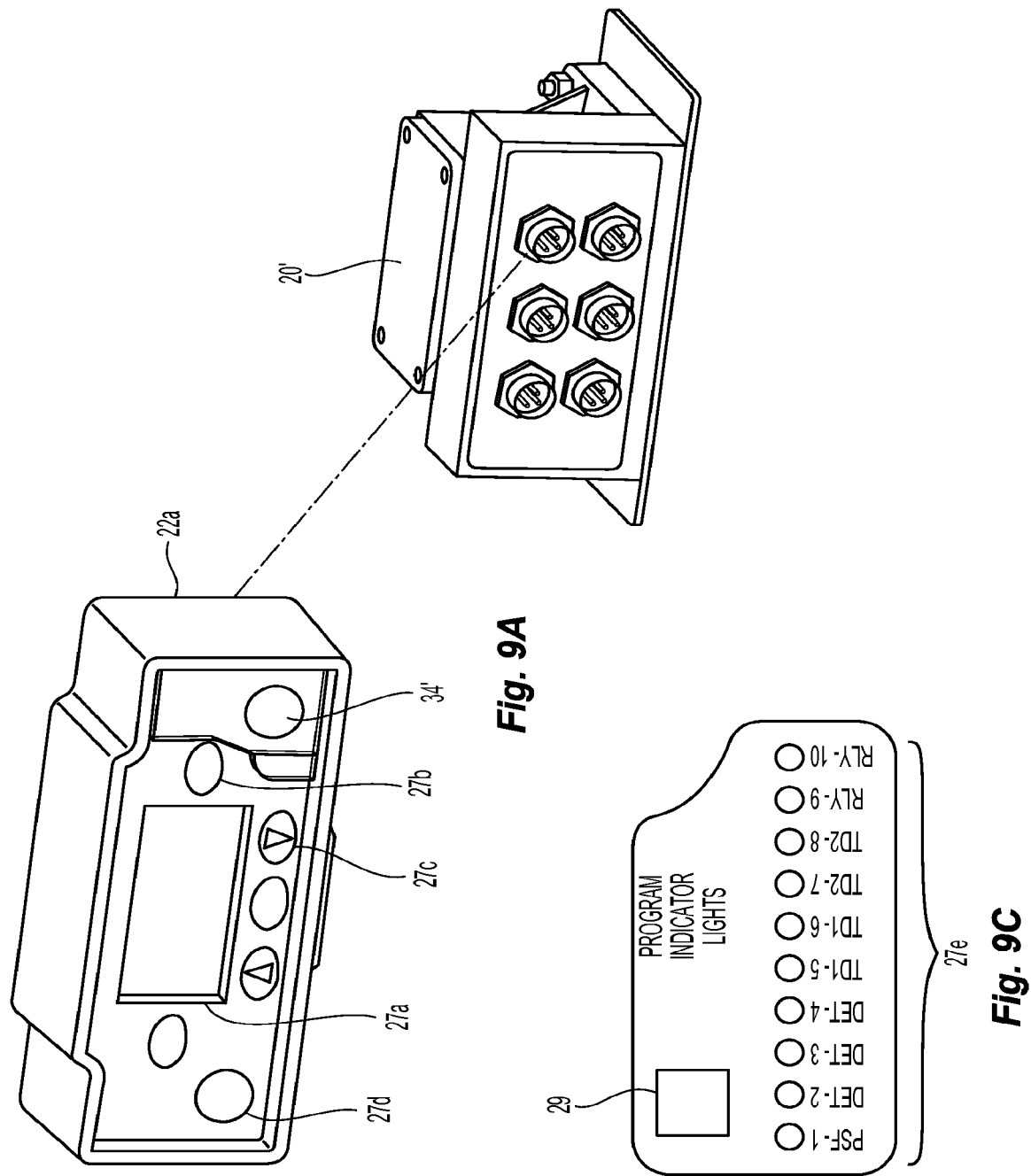

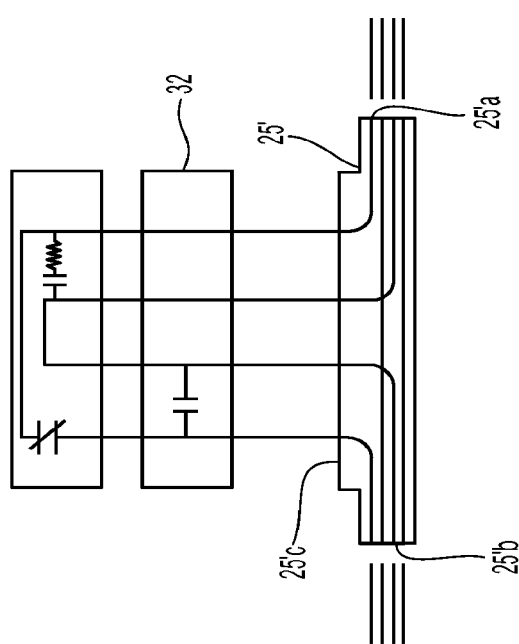
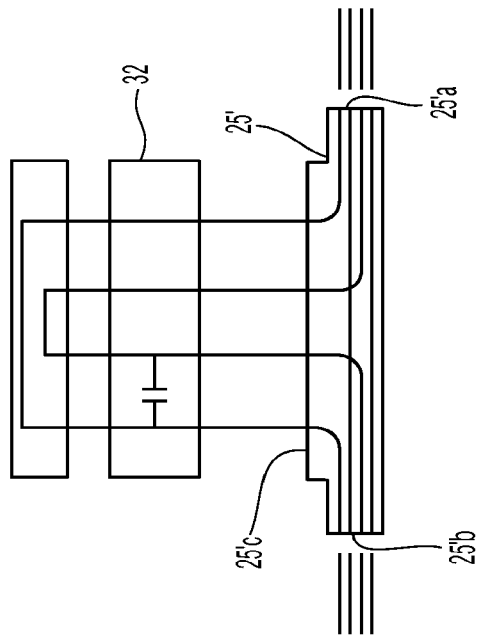

FIRE SUPPRESSION SYSTEMS AND METHODS

CROSS-REFERENCE TO RELATED APPLICATIONS

This application is a continuation of U.S. application Ser. No. 14/430,188, which is a 371 National Stage of International Application No. PCT/US2013/061219, filed Sep. 23, 2013, which is a continuation-in-part of U.S. application Ser. No. 29/449,818, filed Mar. 15, 2013, now U.S. Pat. No. D745,833, and which claims the benefit of U.S. Provisional Patent Application No. 61/794,105, filed Mar. 15, 2013 and U.S. Provisional Patent Application No. 61/704,551, filed Sep. 23, 2012. These applications are incorporated herein by reference in their entireties.

BACKGROUND

Known vehicle fire suppression systems include the A-101 Fire Suppression System and the Automatic Fire Suppression System (AFSS), each from ANSUL®, a brand of Tyco Fire Protection Products. Data/Specification Sheets describing each of the known systems are attached as Exhibits to each of U.S. Provisional Patent Application Nos. 61/704,551 and 61/794,105.

SUMMARY

The present invention is directed to a fire suppression system for vehicles and industrial applications. The preferred embodiments provide for arrangements of an input bus and output bus coupled to a centralized controller to provide for automatic and manual detection of a fire and manual and automatic system actuation in response to the fire. The preferred arrangements further provide for system information regarding the status and operation of the system components. Additionally, the preferred arrangements of system components provide for expandability and programmability to configure a system for the protection of multiple and variable hazards using customized or programmed detection and/or actuation. Moreover, the embodiments described herein facilitate system installation by using preferably configured connectors and color coded schemes.

The preferred system includes a fire fighting agent supply coupled to a one or more fixed nozzles to protect a hazard or area in which an ignition source and fuel or flammable materials may be found. The fire fighting agent supply preferably includes one or more storage tanks or cylinders containing the fire fighting agent, such as for example a chemical agent. Each storage tank cylinder includes a pressurized cylinder assembly configured for pressurizing the storage tanks for delivery of the agent under an operating pressure to the nozzles to address a fire in the hazard.

The pressurized cylinder assembly includes an actuating or rupturing device or assembly which punctures a rupture disc of a pressurized cylinder containing a pressurized gas, such as for example nitrogen, to pressurize the storage tank for delivery of the fire fighting agent under pressure. In order to operate the rupturing device, the system provides for automatic actuation and manual operation of the rupturing device to provide for respective automated and manual delivery of the chemical agent in response to a fire for protection of the hazard. The preferred rupturing device includes a puncturing pin or member that is driven into the rupture disc of the pressurized cylinder for release of the pressurized gas. The puncturing pin of the rupturing device may be driven electrically or pneumatically to puncture the rupture disc of the pressurized cylinder. A preferred device for driving the puncturing pin is a protracted actuation device (PAD), which includes an electrically coupled rod or member that is disposed above the puncturing pin. When an electrical signal is delivered to the PAD, the rod of the PAD is driven into the puncturing pin which punctures the rupture disc of the pressurized cylinder. The system provides for automatic and manual operation of the PAD, and more preferably provides for electric manual operation of the PAD.

The preferred system includes a preferably centralized controller for automated and manual operation and monitoring of the system. More specifically, the system includes a controller or interface control module (ICM) that is preferably coupled to a display device which displays information to a user and provides for user input to the ICM. To provide for fire detection and actuation of the pressurized cylinder assemblies and the fire protection system, the ICM is coupled to at least one input data communication bus for analog and digital devices and more preferably one or more detection devices which provide for automated or manual fire detection within the hazard. The ICM is also coupled to an output bus for communication with the PADs to initiate system actuation. The ICM is also coupled to an input power supply bus for powering the ICM and providing the power, detection, control and actuating signals respectively to the detectors of the input bus and PADs of the output bus.

The preferred input bus includes one or more digital fire detection devices and at least one manual actuating device. The fire detectors of the system can include analog and digital devices for various modes for fire detection including: (i) spot thermal detectors to determine when the surrounding air exceeds a set temperature, (ii) linear detection wire which conveys a detection signal from two wires that are brought into contact upon a separating insulation material melting in the presence of a fire, (iii) optical sensors which differentiate between open flames and hydrocarbon signatures, and (iv) a linear pressure detector in which pressure of an air line increases in the presence of sufficient heat. The actuating device is preferably a manual push button which sends an actuating signal to the controller for output of an electrical actuating signal to the PAD of the pressurized cylinder assembly. Accordingly, the preferred system provides for manual actuation of the system via an electrical signal to the PAD. The devices of the input bus may be interconnected by connection cable which may include one or more sections of linear detection wire. The connection cable of the input bus is coupled to the ICM. The detection devices may be digital devices for direct communication with the ICM. Alternatively, the detection devices may be analog devices which are coupled to a detection module for preferred digital communication with the ICM.

The ICM is preferably a programmable controller having a processor or microchip. The ICM may include an input device, i.e., a toggle switch or alternatively the ICM may be coupled to a separate user interface for program input, such as for example, the accompanying display device. Alternatively, the ICM may include wireless communication capabilities, a USB or other port for connection to a computer through which the program, system history, customized settings or firmware may be entered, uploaded or downloaded. In one preferred embodiment, the ICM can be configured to program the detection or actuating devices respectively disposed on the input and output buses. Exemplary device programming, for example, can set threshold levels and other parameters to provide for customized detection for a particular hazard. Accordingly, customized programming of the detection device can provide for protection of multiple and variable hazards.

The ICM preferably receives input signals on the input bus from the detection devices for processing and where appropriate, generating an actuating signal to the PAD along the output bus. Moreover, the processor is preferably configured for receiving feedback signals from each of the input and output buses to determine the status of the system and its various components. More specifically, the ICM may include internal circuitry to detect the status of the input bus, i.e., in a normal state, ground state, whether there is an open circuit, or whether there has been a signal for manual release. Alternatively or in addition to, detection modules can be configured with internal circuitry that communicates with the ICM to detect the status of the detection device, i.e., in a normal state, short circuit, ground state, open circuit, manual release and/or automatic release.

In one embodiment of the system, the actuating devices or PADs are coupled to the output bus for direct communication with the ICM. Accordingly, the internal circuitry of the preferred ICM can detect the status of the actuating device, e.g., ground fault. Alternatively, a releasing module may couple the PADs device to the ICM. The preferred releasing modules include internal circuitry so as to be individually identifiable or addressable by the ICM. The preferred releasing module can be further configured to couple multiple PADs to the ICM. Accordingly, the preferred releasing module can be used to expand the protection capability of the system by facilitating the addition of storage tanks and pressurized cylinder assemblies to protect the hazard or to protect additional hazard areas.

The releasing module and ICM can be configured individually or in combination to define a desired actuating sequence or pattern for actuating the PADs coupled to the releasing module. Accordingly, in one particular aspect, the releasing module and/or ICM is configured to provide for selective electrical actuation of multiple suppression devices including electrically actuating more than four or up to ten or more actuating devices or PADs. A preferred internal circuitry provides for sufficient current actuating pulse to the PADs, preferably 3 Amps at 24 volts and more preferably 3 Amps at 40 volts to supply sufficient energy to actuate multiple actuating devices or PADs. In addition, the internal circuitry can detect the status of the actuating device or PAD, for example, to determine if there is a ground fault.

The ability to interconnect and expand system components with a central controller over one or more input and output bus lines provides for fire suppression systems of varying complexity. In one particular embodiment, the system includes a controller, a first input bus with at least one fire detection device and at least one manual actuating device, the input bus provides for connecting analog and digital devices to the centralized controller. An output bus with at least one actuation device coupled to a pressurized cylinder for discharge of a fire fighting agent. In another embodiment, the system includes a controller, a first input bus, at least a second input bus with at least one fire detection device and at least one manual actuating device, and an output bus with at least one actuation device coupled to a pressurized cylinder for discharge of a fire fighting agent. Yet another embodiment provides for an input bus and an output bus with each bus including at least one programmable module coupled to the ICM for control of the devices along the input and output buses.

The preferred system includes a display interface device to monitor, operate and preferably program the ICM and the components disposed along the input and output buses. In one particular aspect, the display provides visual indication of the status of the input and output buses including, e.g., indication of: a normal state, ground state, open circuit, manual release. Moreover, the preferred display is coupled to the ICM to provide for programming and operational input. For example, the ICM includes visual indicators and/or visual displays that are coupled with user input devices, such as for example, push buttons, toggle switches, and/or directional buttons in order to scroll, select, edit, reset and/or input, etc. operational parameters of the system and its components. In one particular aspect, the interface display includes a manual actuating button to send an electrical actuating signal to the ICM to relay a corresponding manual electric actuation signal to the actuation device or PAD on the output bus. In another particular aspect, the interface display includes a display screen coupled to any one of a visual or audible alarm which indicates system problem requiring attention. The interface display further preferably includes a silence button to silence the alarm for a defined period of time, for example, two hours before the alarm notifies system personnel of an unresolved issue. Given the harsh environmental conditions around which the fire suppression system may be installed, the alarm is preferably constructed within the housing of the user interface display and is constructed to provide drainage in the presence of water or rain.

In one particular aspect, the visual indicators of the interface display include LEDs which indicate the status of system components using, for example, a binary indicator, i.e., on-off. Alternatively, the LEDs may use a color scheme to indicate the status of a system component, i.e., green—normal status, yellow—fault, red—open connection. In addition or alternatively, the interface display may use text and/or dynamic or static images to visually indicate the system status. For example, the display may use pictures or icons as the visual indicators.

A preferred embodiment of a vehicle fire suppression system includes a centralized controller; at least one input bus coupled to the centralized controller; at least one output bus to the centralized controller; at least one fire detection circuit including a plurality of fire detection devices and at least one manual actuating device. The fire detection circuit is coupled to the at least one input bus for monitoring of the fire detection circuit. At least one releasing circuit having at least one actuating device for electric and pneumatic release of an extinguishment is preferably coupled to the at least one output bus for monitoring of the releasing circuit. An alarm is preferably coupled to at least one controller for providing an audio signal indicting the status of the system along any one of the detection circuit and the releasing circuit. At least one user interface device is coupled to the centralized controller to program at least one of the plurality of detection devices or the at least one actuating device to define operational parameters including any one of threshold levels, time delays, or discharge sequences and patterns, the at least one user interface includes at least one LED indicator to indicate the status of the system including a normal status, a fire detection condition, and a release condition, the at least one user interface includes at least one toggle button to any one of input, select, edit, reset the operational parameters of the plurality of detection devices and the at least one actuating device. The at least one toggle button includes a manual actuating button for sending a manual actuating signal to the at least one actuating device and a silence button for the audio signal.

A preferred method of operating a vehicle fire suppression system with a user interface coupled to a centralized controller is provided. The method preferably includes depressing a first toggle button a first time to select any one of program the centralized controller in an isolated condition of the system, silence an alarm indicator of a fault detection condition of the system and resetting a release time delay in response to the alarmed condition, the time delay being between a fire detection condition of the system and a release condition of the system in which an extinguishing agent is released; and depressing the first toggle button a second time when depressing the first toggle button the first time selects program of the centralized controller, depressing the first toggle button the second time defining the release time delay, depressing the first toggle button the second time for a first duration defines a first time delay and depressing the first toggle button the second time for a second duration different than the first duration to define a second time delay different than the first time delay.

The components and more particularly the devices of the input bus are preferably interconnected by wire or cable. In one particular system embodiment, the connection cable carries control, power, data and/or sensing signals between the detection devices and the ICM. A preferred connector is provided for interconnecting segments of the connection cable so as to define a main bus of power for use by the devices of the input bus. One particular embodiment of a connector is substantially T-shaped having a first end, a second end and an intermediate connector end extending between the first and second end. The preferred connector includes at least one, and more preferably four internal wire(s), which extends from the first end to the intermediate connector and to the second end. With the first end of the connector coupled to an electrical signal defining an operating voltage, the internal wire of the preferred connector has the same voltage at each of its first, second and intermediate ends. Accordingly, connection wire coupled to the second end of the preferred connector receives the same input voltage as is provided at the first end of the connector. In another aspect, a device, such as for example, a sensing device may engage the intermediate connection end such that the device receives the signal at the same voltage that is provided at the first end of the connector. The preferred connector therefore provides main bus voltage along the length of the input bus.

In yet another aspect of the connection system, a color scheme is employed to facilitate proper interconnection between system components. For example, the ICM may include input ports configured with terminal connectors for engaging one or more connection cables of the input and/or output bus. The connection cable may include a colored connector at its end and the terminal connectors of the ICM may include correspondingly or similarly colored connectors for engaging the end of the connection cable. The use of one or more color schemes facilitates installation of the system and or prevents tampering or accidental disconnection.

BRIEF DESCRIPTION OF THE DRAWINGS

The accompanying drawings, which are incorporated herein and constitute part of this specification, illustrate exemplary embodiments of the invention, and, together with the general description given above and the detailed description and attachments given below, serve to explain the features of the invention.

FIG. 4 is a is a schematic illustration of one embodiment of a detection module used in the system of FIG. 1A.

FIG. 5 is a is a schematic illustration of one embodiment of a releasing module used in the system of FIG. 1A.

FIG. 9A is an interface display device for use with the system of FIG. 8.

FIG. 9C is another embodiment of interface display device.

FIGS. 10A-10C are schematic illustrations of an installed preferred cable connector.

DETAILED DESCRIPTION

Figure 1:
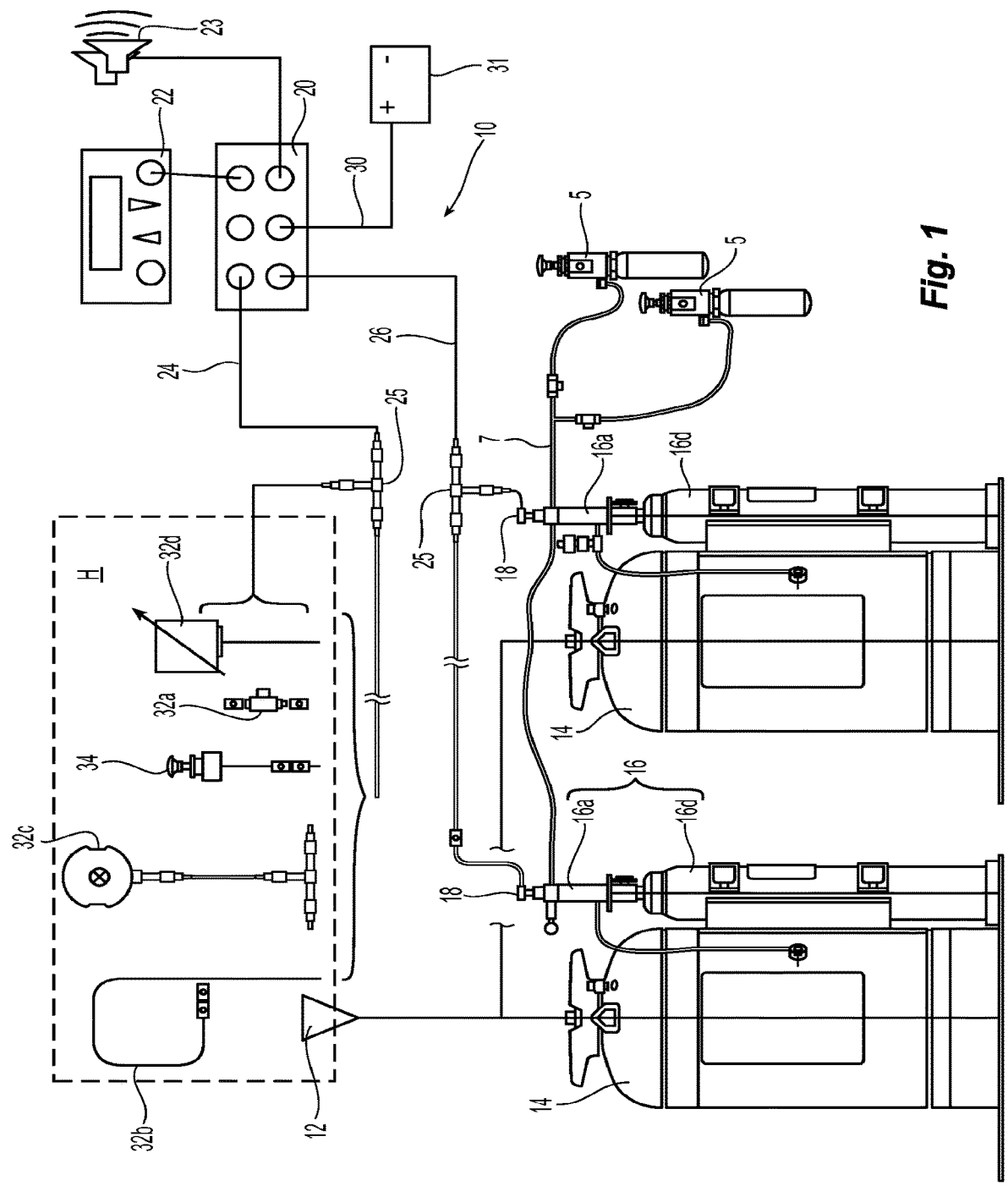
FIG. 1 is a schematic illustration of one embodiment of a fire suppression system.

FIG. 1 is a schematic illustration of a first embodiment of a suppression system 10 that includes a fire fighting agent supply coupled to a preferably fixed nozzle 12 to protect a hazard H or area in which an ignition source and fuel or flammable materials may be found. As shown, the fire fighting agent supply preferably includes one or more storage tanks or cylinders 14 containing the fire fighting agent, such as for example a chemical agent. Each storage tank 14 cylinder preferably includes a pressurized cylinder assembly 16 configured for pressurizing the cylinders 14 for delivery of the agent under an operating pressure to the nozzle 12 to address a fire in the hazard H. The preferred pressurized cylinder assembly 16 includes a rupturing device 16a which punctures a rupture disc of a pressurized cylinder 16b containing a pressurized gas, such as for example nitrogen, to pressurize the storage tank 14 for delivery of the fire fighting agent under pressure.

In order to operate the rupturing device 16a, the system 10 provides for automatic actuation and manual operation of the rupturing device 16a to provide for respective automated and manual delivery of the chemical agent in response a fire for protection of the hazard H. The preferred rupturing or actuating device or assembly 16a includes a puncturing pin or member that is driven into the rupture disc of the pressurized cylinder 16b for release of the pressurized gas.

The puncturing pin of the rupturing device 16a may be driven electrically or pneumatically to puncture the rupture disc of the pressurized cylinder 16b.

The actuating device 16 preferably includes a protracted actuation device (PAD) 18 for driving the puncturing pin of the assembly into the rupture disc. The PAD 18 generally includes an electrically coupled rod or member that is disposed above the puncturing pin. When an electrical signal is delivered to the PAD 18, the rod of the PAD is driven directly or indirectly into the puncturing pin which punctures the rupture disc of the pressurized cylinder 16b. A preferred pressurized cylinder assembly is shown in Form No. F-95143-05 which is attached to U.S. Provisional Patent Application No. 61/704,551 and shows a known rupturing device for either manual and pneumatic or automatic electrical operation to drive a puncture pin. The system 10 provides for automatic and manual operation of the PAD 18. Unlike prior industrial/fire suppression systems having PADs and rupture discs, the preferred system 10 provides for electric manual operation of the PAD 18 as explained in greater detail below. The system 10 can further provide for one or more remote manual operating stations 5 to manually actuate the system. As is known in the art, the manual operating stations 5 can rupture a canister of pressurized gas, for example, nitrogen at 1800 psi, to fill and pressurize an actuation line which in turn drives the puncturing pin of the rupturing assembly 16a into the rupturing disc thereby actuating the system 10.

Figure 12:
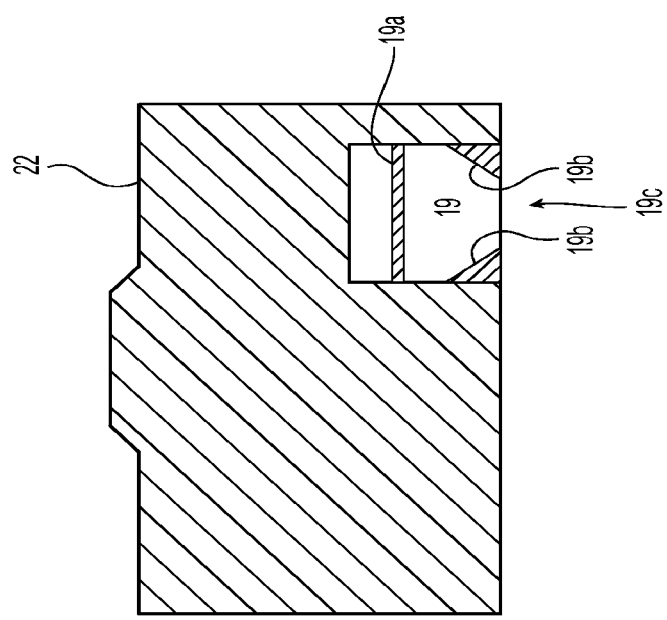
FIG. 12 is one preferred embodiment of an alarm sounder for use in the interface display devices of FIGS. 9A & 9B.

With reference to FIG. 1, the preferred system includes a preferably centralized controller for automated and manual operation and monitoring of the system 10. More specifically, the system 10 includes the centralized controller or interface control module (ICM) 20. Preferably coupled to the ICM 20 is a display device 22 which displays information to a user and a provides for user input to the ICM 20. An audio alarm or speaker 23 may also be coupled to the ICM 20 to provide for an audio alert regarding the status of the system 10. More preferably, an audio alarm or sounder is incorporated into the housing of the display device 22 and configured to operate in a wet environment. Shown in FIG. 12 is a representative image of a display device housing having a sounder chamber 19 separated by a sounding disc 19a. The interior of the chamber preferably includes an inclined or oblique surface to define one or more tapering walls 19b of the chamber 19 which lead to an opening 19c which permits drainage of any water or moisture while preferably maximizing alarm output. The sounder chamber 19 is preferably located along the housing such that moisture can drain from the chamber 19 when the display device housing is in its installed position.

To provide for fire detection and actuation of the cylinder assemblies 16 and the fire protection system, the ICM 20 further includes an input data bus 24 coupled to one or more detection sensors, an output data bus 26 coupled to the preferred PADs 18 and input power supply bus 30 for powering the ICM 20 and the control and actuating signals as explained in greater detail below. The input bus 24 preferably provides for interconnection of digital and analog devices to the ICM 20; and more preferably includes one or more fire detection devices 32 and preferably at least one manual actuating device 34. The fire detection devices 32 of the system 10 can include analog and digital devices for various modes for fire detection including: (i) spot thermal detectors 32a to determine when the surrounding air exceeds a set temperature, (ii) linear detection wire 32b which conveys a detection signal from two wires that are brought into contact upon a separating insulation material melting in the presence of a fire, (iii) optical sensors 32c which differentiate between open flames and hydrocarbon signatures, and (iv) a linear pressure detector 32d in which pressure of an air line increases in the presence of sufficient heat. Examples of the detection devices are shown and described in Form No. F-2011158-01 which is which is attached to U.S. Provisional Patent Application No. 61/704, 551. The manual actuating device 34 is preferably a manual push button which sends an actuating signal to the ICM 20 for output of an electrical actuating signal along to the PAD 18 of the pressurized cylinder assembly 16. Accordingly, the preferred system provides for manual actuation of the system via an electrical signal to the PAD. Together the detection and manual actuating devices 32, 34 define a detecting circuit of the system 10 of either an automatic or manual detection of a fire event.

Figure 1A:
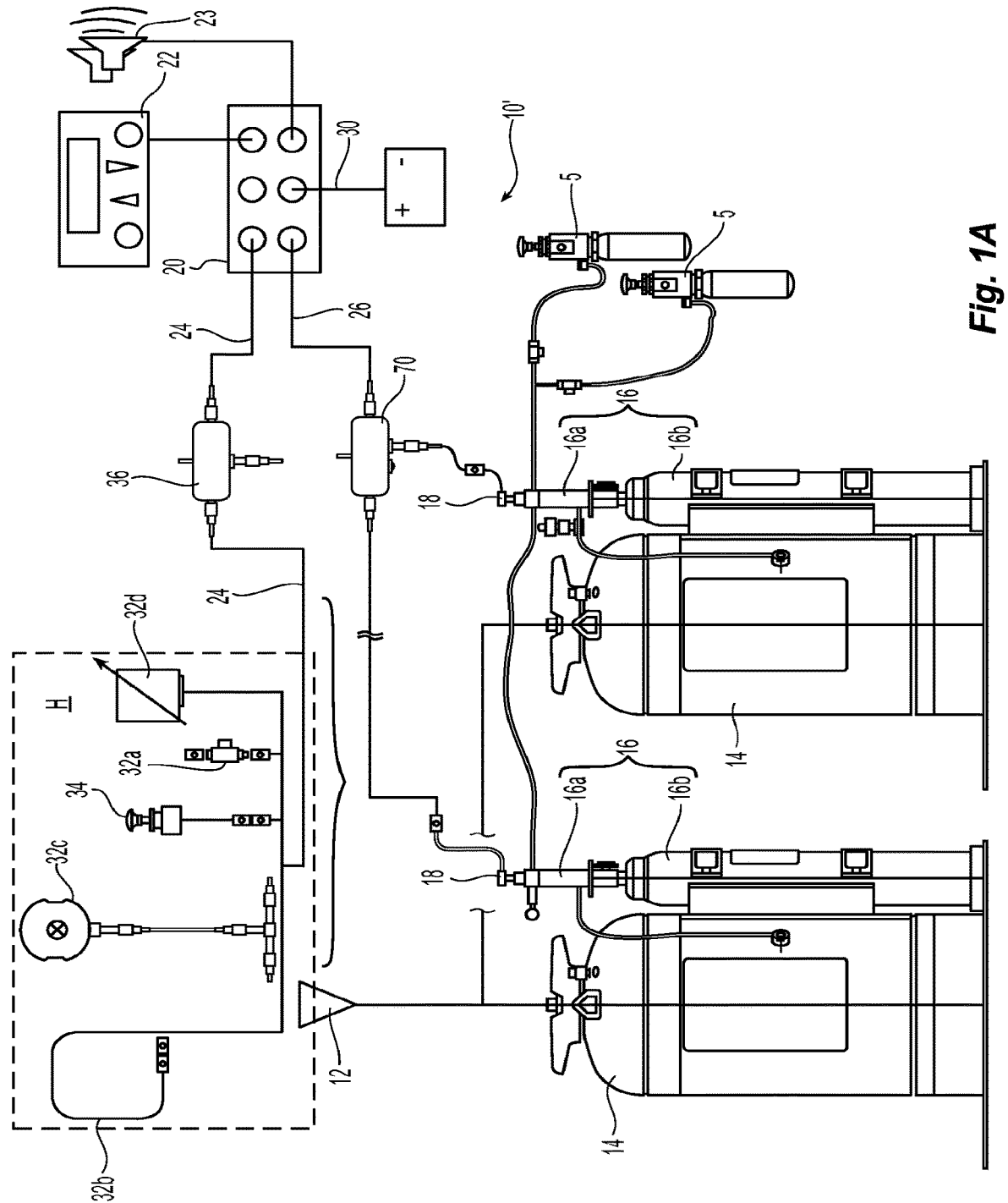
FIG. 1A is a schematic illustration of another embodiment of a fire suppression system.

The devices 32, 34 of the input bus 24 may be interconnected by two or more interconnected connection cables which may include one or more sections of linear detection wire 32b. The cables are preferably connected by connectors 25. The connection cable of the input bus 24 is coupled to the ICM. The connection cables of the input and output buses 24, 26 preferably define closed electrical circuits with the ICM 20. Accordingly, a bus may include one or more branch terminators, for example, at the end of a linear detection wire. Additionally, the detecting circuit can include an end of line element which terminates the physically furthest end of the input bus, for example, and monitors the detecting circuit of the system 10. The detection devices 32, 34 may be digital devices for direct communication with the ICM as seen in FIG. 1. Alternatively, the detection devices may be analog devices which are coupled to one or more detection modules 36 for preferred digital communication with the ICM as schematically shown in FIG. 1A.

Referring again to FIG. 1, the ICM 20 is preferably a programmable controller having a microprocessor or microchip. The ICM preferably receives input signals on the input bus 24 from the detection devices 32 for processing and where appropriate, generating an actuating signal to the PAD along the output bus 26. Moreover, the processor is preferably configured for receiving feedback signals from each of the input and output buses to determine the status of the system and its various components. More specifically, the ICM may include internal circuitry to detect the status of the input bus, i.e., in a normal state, ground state, whether there is an open circuit, or whether there has been a signal for manual release.

Figure 2:
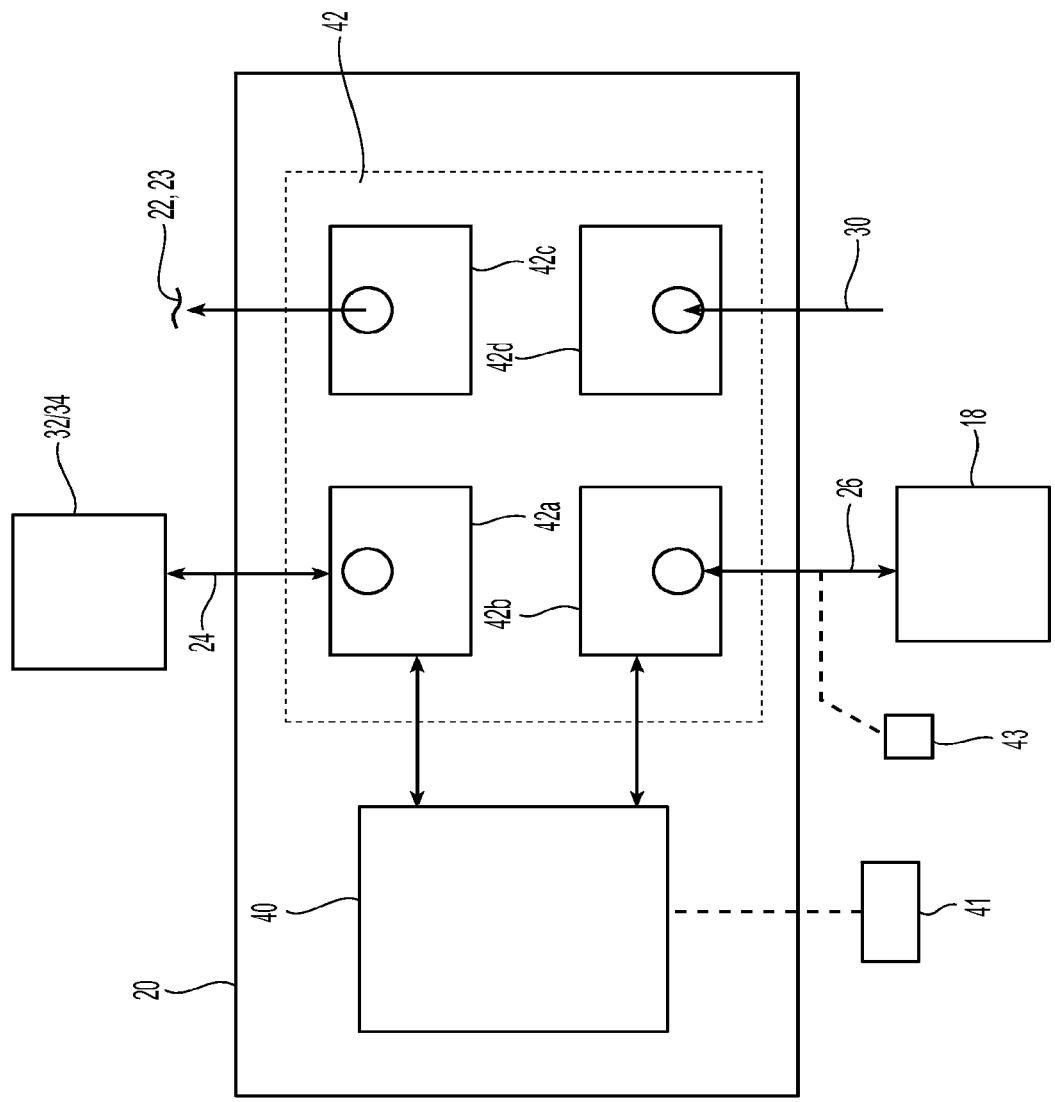
FIG. 2 is a schematic illustration of one embodiment of a centralized controller in the system of FIG. 1.

Shown schematically in FIG. 2 is the ICM 20 and its internal components coupled with detection devices 32, 34 along input data bus 24 and with PAD 18 along output data bus 26. In one embodiment of the ICM 20, the internal components preferably include a microprocessor 40 coupled to internal circuitry 42 having a first portion 42a coupled to the input data bus 24, second portion 42b coupled to the output data bus 26, a third portion 42c for output to the display and/or audio devices 22, 23 and a fourth portion 42d of internal circuitry 42 coupled to the power bus 30 for receiving power from the power supply.

In one preferred aspect of the system, the ICM 20 and its internal components are configured to monitor the status of the input data bus and the detection devices 32, 34. More specifically, the ICM 20 and its internal components can be configured to determine whether the input data bus 24 and the associated components have experienced a fault condition due to either environmental conditions such as, for example, vibration, moisture or wear. Moreover, the internal components of the ICM 20 can be configured with a monitoring circuit in its internal circuitry to discern whether the input data bus 24 and its associated devices 32, 34 are in any one of a: (i) normal state; (ii) a sensed or automated detection state; and/or (iii) a manual release detection state (manual actuation). In addition, the internal circuitry provides for a deadzone or unused range of voltage/resistance to discern from an automatic or sensed detection from a detection device 32 or a manual release detection from a manually operated actuating device 34.

Figure 3:
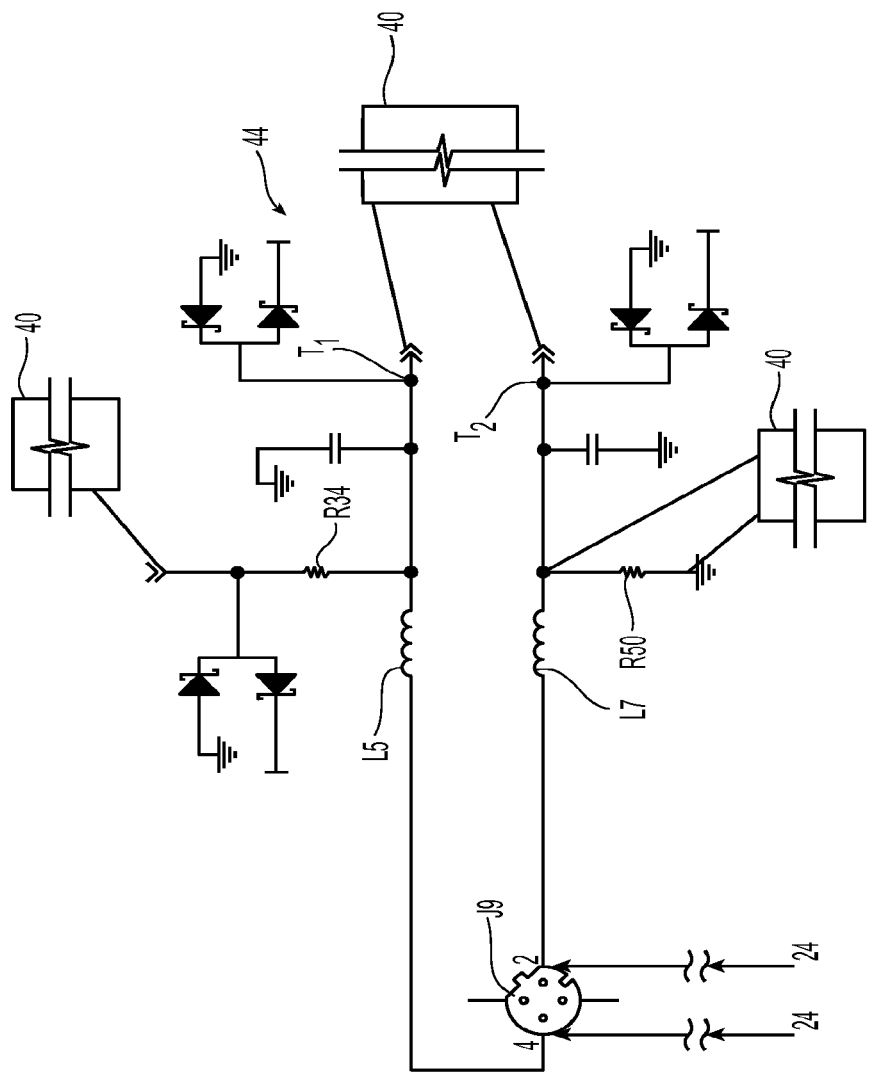
FIG. 3 is one embodiment of a fault detection circuit used in the controller of FIG. 2.

With reference to FIG. 2, the first portion 42a of the internal circuitry of the ICM 20 defines in part or whole the preferred fault detection circuit in combination with the microprocessor 40 for the input bus 24 and the associated components 32, 34. Shown in FIG. 3 is a preferred monitoring circuit 44 for the first portion 42a of the internal circuit. The monitoring circuit 44 includes a first resistor R34, a first inductor L5, a mini DIN connector J9, a second inductor L7 and a second resistor R50 coupled to ground. Coupled to the mini DIN J9 is the input bus 24 at pins 4 and 2. In detecting a fault, a sensing current, preferably about 200 microamps (200 μA) is sent through the first resistor R34, the first inductor L5, out pin 4 of the mini-DIN through the input bus 24 and its devices 32, 34 and back through the mini-DIN J9 at pin 2, through the second inductor L,7 and through the second resistor R50. The microprocessor 40 evaluates the voltage across second resistor R50 to determine if there is a fault in the input bus 24 and associate devices. If it is determined that there is a voltage across second resistor R50 then there is no fault. If there is no voltage across second resistor R50, then there is a fault. To determine as to whether or not the fault is a ground fault, i.e., wire in contact with the vehicle chassis or an open circuit, the microprocessor 40 evaluates the voltage at each of the first terminal T1 and second terminal T2 of the monitoring circuit. From the voltage differential, the microprocessor 50 determines a resistance value across the terminals T1, T2 which define the state of the detection circuit defined by the input bus 24 and its associated devices 32, 34. In one particular embodiment, if the state of the detection circuit 24, 32, 34 is defined by the following resistance values (ohms), measured at T1, T2: (i) 350-500 ohms and 700-10,000 ohms=normal state; (ii) 0-350 ohms=a sensed or automated detection state; (iii) 500-700 ohms=a manual release detection state (manual actuation); and (iv) greater than (>) 10,000 ohms=an open circuit. Accordingly, the range of resistance at 350-500 ohms defines a non-state or deadzone for the monitoring circuit 44 to create a gap between the sensed and manual released detection resistance values so that the system can distinguish between the two states. The preferred open circuit range of greater than 10,000 ohms is defined by a preferred total system wire length and resistance providing an equivalent resistance of about ohms. Accordingly, the open circuit range can be alternatively configured so long as it accounts for the equivalent resistance of the system. The sensing current is preferably taken from the power bus 30. Where the system 10 is a vehicle fire suppression system, in order to properly detect a ground fault state, the ground is power supply coupled to the power bus is preferably referenced or grounded to the vehicle chassis.

With reference to FIG. 1A, and the alternate embodiment of the system 10' having detection modules 36 disposed between the detection devices 32, 34 and the ICM 20, the detection modules 36 can be configured with internal circuitry that communicates with the ICM to detect a fault state in the detection circuit defined by the input data bus 24 and the associated devices 32, 34. Shown in FIG. 4 is a schematic illustration of the internal components of one embodiment of a detection module 36. The detection module 36 preferably includes its own microprocessor 50 and associated internal circuitry 52. The internal circuitry 52 preferably includes a first portion 52 as in communication with the ICM 20 via the input bus 24. Additionally, the internal circuitry has a second portion 52b in communication with one or more of the detection devices 32, 34. Moreover, the second portion 52b of the internal circuit preferably includes a monitoring circuit that works in conjunction with the detection module processor 50 to detect a fault within the input data buses and associated detection devices 32, 34. More preferably, the monitoring circuit is configured as the monitoring circuit 44 previously described and shown in FIG. 3 with the microprocessor 50 measuring and processing the voltages across detection resistor 50 and terminal ends T1, T2 to determine the state of the detection circuit. The detected status or feedback from the fault detection circuit, as defined by the detected resistance in the detection resistor R50, can be communicated from the detection module 36 to the ICM 20 over the input 24 for display to the operator at display device 22.

Referring again to FIG. 1, the output bus 26 and the actuating devices or PADs 18 in combination with the ICM 20 preferably define the releasing circuit of the system 10. As with the detection side, it is desirable to detect faults and more particularly ground faults, in the releasing circuit that may have come about due to environmental conditions, such as for example, vibration, moisture or wear. In one embodiment of the system, the actuating devices or PADs 18 are coupled to the output bus 26 for direct communication with the ICM. Accordingly, the internal circuitry of the preferred ICM can detect the status of the actuating device, e.g., ground fault.

Referring again to FIG. 2, shown is a schematic illustration of the ICM 20 including its microprocessor 40 and associated internal circuitry having a second portion 42b in communication with the PADs 18 of the system 10 over the output data bus 26. To provide for ground fault detection in the releasing circuit defined by output bus 26 and PADs 18, the second portion 42b of the internal circuit define in whole or part, a preferred ground fault monitoring circuit.

Figure 3A:
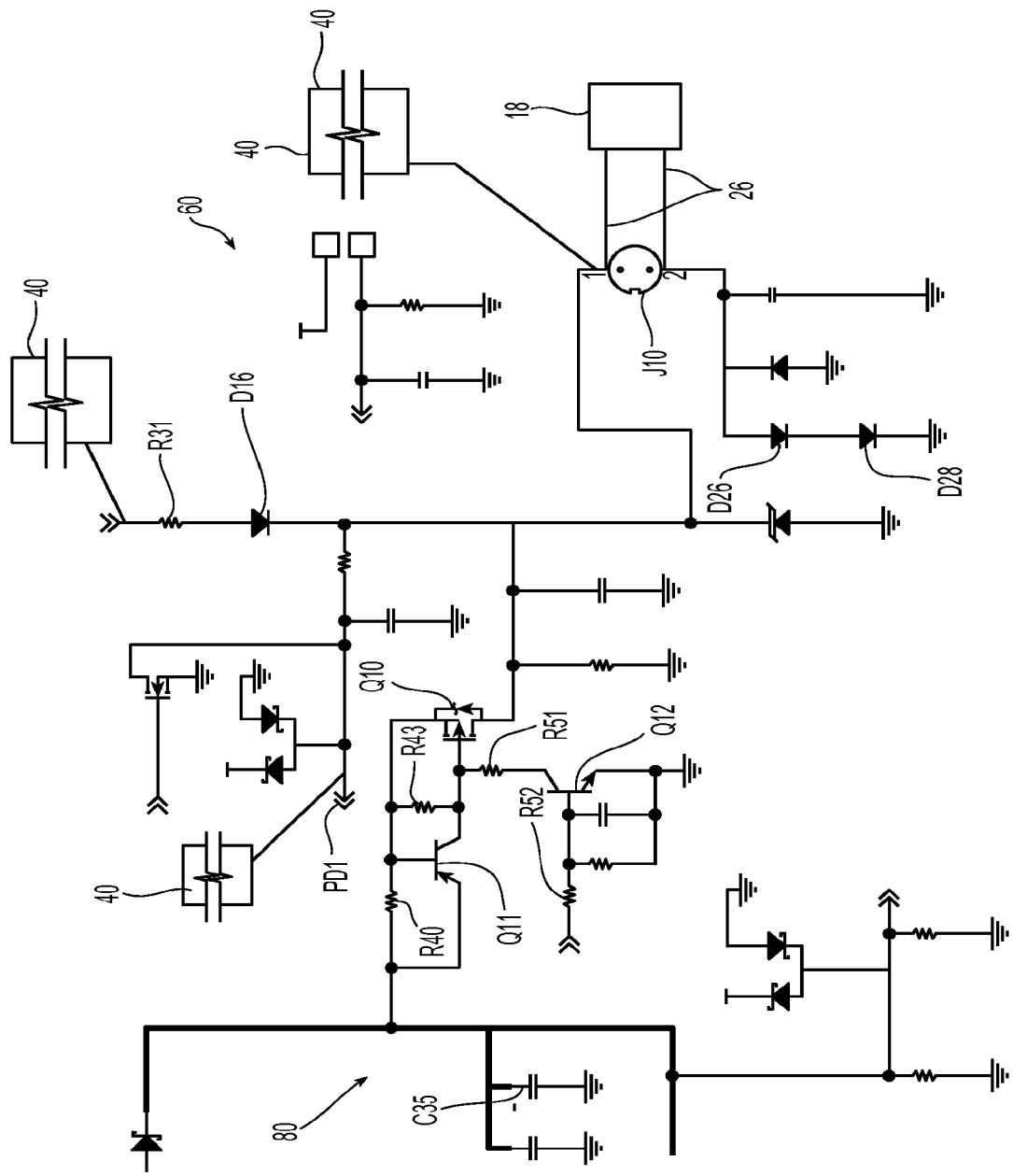
FIG. 3A is another embodiment of a fault detection circuit used in the controller of FIG. 2.

Shown in FIG. 3A is a preferred ground fault detection circuit 60 for the release circuit of the system 10. The ground fault detection circuit 60 preferably includes a first resistor R31, a first diode D16, a mini DIN connector J10, a second diode D26 and a third diode D28 in series with the second diode D26 and coupled to ground. Coupled to the mini DIN J10 is the output bus 26 at pins 1 and 2. In starting ground fault detection, a sensing current, preferably from the power source bus 30 is initiated by processor 40 by applying a voltage differential across first resistor R31. In one embodiment, the initiating voltage ("Pullup_Enable") is equivalent to a reference voltage established by an A/D converter reading the voltage ("PAD_Detect") at terminal PD1 by processor 40, which detects a PAD 18 of the system. The initiated current flows through resistor R31 and first diode D16, out through mini DIN J10 at pin 1, through the PAD(s) 18, back into the monitoring circuit through pin 2 of the mini-DIN J10, then through second and third diodes D26, D28 to circuit ground. If there is no ground fault in the releasing circuit defined by the output bus 26 and PAD(s) 18, current will flow through second and third diodes D26, 28; and as a result, a voltage of a few hundred millivolts is detectable at pin 1 of the mini DIN J10. Accordingly, the microprocessor 40 of the ICM 20 is preferably configured to monitor the voltage at pin 1 of the mini DIN J10. When the microprocessor 40 of the ICM 20 determines that there is only background noise voltage and substantially no voltage at pin 1 due to the lack of current flow at the first and second diodes D26, D28, the ground fault detection circuit 60 and ICM can indicate a ground fault in the releasing circuit of the system 10. In one aspect of the preferred ground fault detection circuit 60 for a vehicle suppression system, the power source providing the sensing current is preferably grounded or referenced to the vehicle chassis. Accordingly, a ground fault condition is defined by a wire of the PAD 18 contacting the vehicle chassis such that current flowing through the ground fault detection circuit 60 travels through the chassis instead of the first and second diodes D26, D28 because current flow through the chassis or ground is the path of least resistance.

Alternatively to coupling the PADs 18 for direct communication with the ICM 20, a releasing module may couple the PAD devices 18 to the ICM 20. With reference to FIG. 1A, and the alternate embodiment of the system 10' having releasing modules 70 disposed between the detection devices 32, 34 and the ICM 20, the releasing modules 70 can be configured with internal circuitry that communicates with the ICM to detect a ground fault in the releasing circuit defined by the output data bus 24 and the associated actuating devices 18. The preferred releasing module 70 can couple a single PAD 18 to the ICM 20 or alternatively couple multiple PADs 18 to the ICM. Accordingly, the preferred releasing module 70 can be used to expand the protection capability of the system by facilitating the addition of storage tanks and pressurized cylinder assemblies to protect the hazard or to protect additional hazard areas.

Moreover, the releasing module 70 can be configured with a ground fault monitoring circuit, such as for example, ground fault detection circuit 60 previously described to determine if any PAD 18 coupled to the releasing module 70 has a ground fault. Shown in FIG. 5 is a schematic illustration of the internal components of one embodiment of a releasing module 70. The releasing module 70 preferably includes its own microprocessor 72 and associated internal circuitry 74. The internal circuitry 74 preferably includes a first portion 74a in communication with the ICM 20 via the output data bus 26. Additionally, the internal circuitry has a second portion 74b in communication with one or more of the actuation devices or PADs 18. Moreover, the second portion 74b of the internal circuit preferably includes a monitoring circuit that works in conjunction with the releasing module processor 72 to detect a ground fault within the output data bus 26 and associated actuation devices 18. More preferably, the monitoring circuit is configured as the monitoring circuit 60 previously described and shown in FIG. 3A with the microprocessor 50 measuring and processing the voltages at pin 1 of the mini-DIN J10 to determine the state of the releasing circuit. The detected status or feedback from the ground fault detection circuit 60 can be communicated from the releasing module 70 to the ICM 20 over the output bus 26 for display to the operator at display device 22.

The preferred detection and releasing modules 36, 70 include internal circuitry so as to be individually identifiable or addressable by the ICM 20 for communication and/or system programming. Moreover, the releasing module can be configured to define a desired actuating sequence or pattern for actuating the PADs coupled to the releasing module. Accordingly, in one particular aspect, the releasing module is configured to provide for selectively firing multiple suppression devices including up to actuating up to about ten actuating devices or PADs. The preferred releasing module includes internal circuitry which provides for sufficient current, preferably 3 Amps at 24 volts to supply sufficient energy to actuate the multiple actuating devices or PADs. In addition, the internal circuitry of the preferred ICM can detect the status of the actuating device or PAD, for example, to determine if there is a ground fault.

The systems 10 include multiple storage tanks 14 and pressurized cylinder assemblies 16 for their actuation. The system 10 is preferably configured with the plurality of pressurized cylinder assemblies daisy chained in series with the releasing circuit configured to electrically actuate each pressurized cylinder assembly 16 in the chain. To address the current requirements for such a configuration, the preferred suppression system 10 includes an actuating circuit to provide high current for electrically actuating more than one cylinder assembly 16, and more preferably more than four pressurized cylinder assemblies 16 interconnected along the output bus 26, which define the releasing circuit of the system 10. The actuating circuit preferably actuates five pressurized cylinder assemblies in series, and more preferably actuate as many as ten (10) and even more preferably more than ten pressurized cylinder assemblies 16 in series. Generally, the preferred high current circuit includes a capacitor that stores current during an unactuated state of the system 10, and discharges the stored current preferably as a current pulse to actuate more than four PADs 18 and more preferably up to ten PADs 18. The actuation of the PADs may be simultaneous or alternatively sequential. The high current actuating circuit preferably provides 3 Amps at 24 Volts for actuating the PADs 18 of the releasing circuit of the system 10. Alternatively or in addition to, the actuating circuit preferably provides 3 Amps at 40 Volts for actuating the PADs 18 of the releasing circuit of the system 10.

The actuating circuit 80 may further include a crow bar circuit as is known in the art to monitor, control and/or limit the release of the preferred stored voltage in order such that the actuating current pulse is sufficiently high to actuate the pressurized cylinder assemblies 16; yet sufficiently low to permit the use of connection cable of the output bus 26 having a length of 250 feet or more. Minimizing the current pulse through the output bus 26 permits the use of lower gauge wire of the interconnecting cable lengths of 250 feet or more. The actuating circuit may further include a monitoring circuit to monitor the magnitude of the current pulse.

Again, each PAD 18 is preferably configured to receive a current pulse which drives its rod member into the actuating pin of the rupturing device 16a to rupture the rupture disc of the pressurized cylinder 16b. The current pulse has a pulse duration of about 10 ms. Moreover, the current pulse preferably defines a magnitude based on the number of actuating devices or PADs coupled to the actuating circuit. More preferably, the actuating circuit is configured with a current pulse magnitude of about 3 Amps DC for the actuation of more than four PADs and more preferably five PADs of the releasing circuit of system 10. The five PADs 18 preferably define a series connected of actuating devices defining a total load on the actuating circuit of about 9 Ohms. To provide the pulse current, the preferred actuating circuit includes a current source in the form of a releasing capacitor charged to a sufficient voltage to provide sufficient current, i.e., 3 Amps, over at least two current pulses. In one particular embodiment the releasing capacitor is charged to 40 Volts before discharge of the 3 Amps of current pulse. The number of PADs or load may be greater than five provided the current pulse magnitude is proportionally and more preferably incrementally increased along with a sufficient increase in the charging voltage of the source capacitor to provide the requisite current over at least two current pulses.

Referring again to FIG. 3A, shown is an exemplary actuating circuit 80 that overlaps or is coupled to a portion of the ground fault detection circuit 60. The actuating circuit 80 includes a releasing capacitor C35, which serves as a current source for the releasing circuit of the system 10. The releasing capacitor C35 preferably has a storage capacity of about 3300 microfarad (g), which is preferably charged to 40 Volts by an external power source. Alternatively, the releasing capacitor C35 may be charged by an internal source, such as for example a supercapacitor, i.e., electric double-layer capacitor (EDLC) or a vehicle battery, upon a releasing signal from the detection circuit of the system to the preferred 40 volts.

Referring again to FIG. 3A, the actuating circuit 80 further includes the mini-DIN J10 for output of the preferred actuating current pulse through the output bus 26 to each of the PADs 18 of the system 10. Formed between the releasing capacitor C35 and the mini DIN J10 is a current limiting circuit which preferably limits the actuating current pulse to no more than 3 Amps. The current limiting circuit includes a first resistor R52 for receiving a releasing signal ("PAD_Release") from the microprocessor of the ICM 20 or releasing module 70. Accordingly, the actuating circuit 80 may be embodied in the internal circuitry of the ICM 20 or a releasing module 70. When the microcontroller gives the command for release, the "PAD_Release" line is pulled from ground to Vcc (3.3 Volts). This turns transistor Q12 on so as to saturate it (Vce<100 mV) and the releasing voltage C35 is dropped across R43 and R51. This makes a source to gate voltage (–Vgs) at transistor Q10 sufficiently large so as to conduct from source to drain and carry current. But as the current from source to drain builds from zero it produces a voltage across resistor R40 in proportion to it. As source current increases, transistor Q11 will start to turn on, because its emitter-base junction is connected across resistor R40, and the emitter to base voltage is approximately 0.7V. When transistor Q11 turns on, collector current starts to flow and this raises the voltage on the gate of transistor Q10 with respect to ground, which reduces the gate to source voltage |–Vgs|, which leads to a reduction in conductivity from source to drain. The current output has a ceiling of approximately 0.7V/0.18Ω, which is 3.9 A. The value of the "ceiling" varies inversely with respect to the resistor R40.

Figure 6:
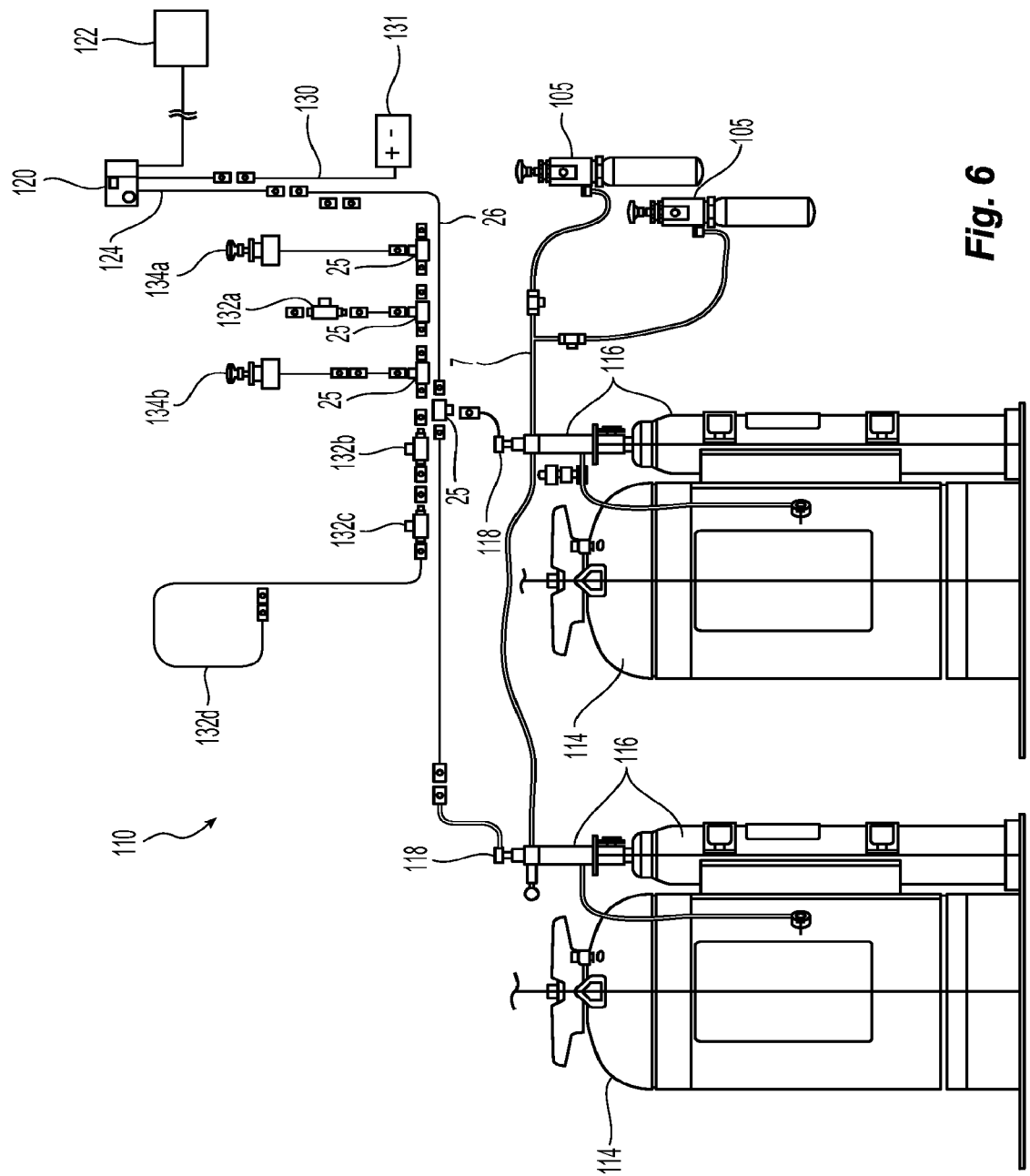
FIG. 6 is a schematic illustration of another embodiment of a fire suppression system having one input bus and one output bus.

The ability to interconnect and expand system components with a central controller over one or more input and output bus lines provides for fire suppressions systems of varying complexity. In one particular embodiment shown schematically in FIG. 6, the system 100 includes a controller 120, an interface display 122, a first input bus 124 with at least one fire detection device 132 and more preferably at least three spot thermal detectors 132*a*, 132*b*, 132*c*, and a linear wire detector 132*d*; however, it should be understood that the number or type of devices 132 could be varied. The first input bus 124 further preferably includes at least one manual actuating device 134 and more preferably at least two manual actuating devices 134*a*, 134*b*. The system 100 further includes an output bus 124 with at least one actuation device and more preferably two PADs 118, each coupled to a pressurized cylinder assembly 116 for discharge of a fire fighting agent.

Figure 7:
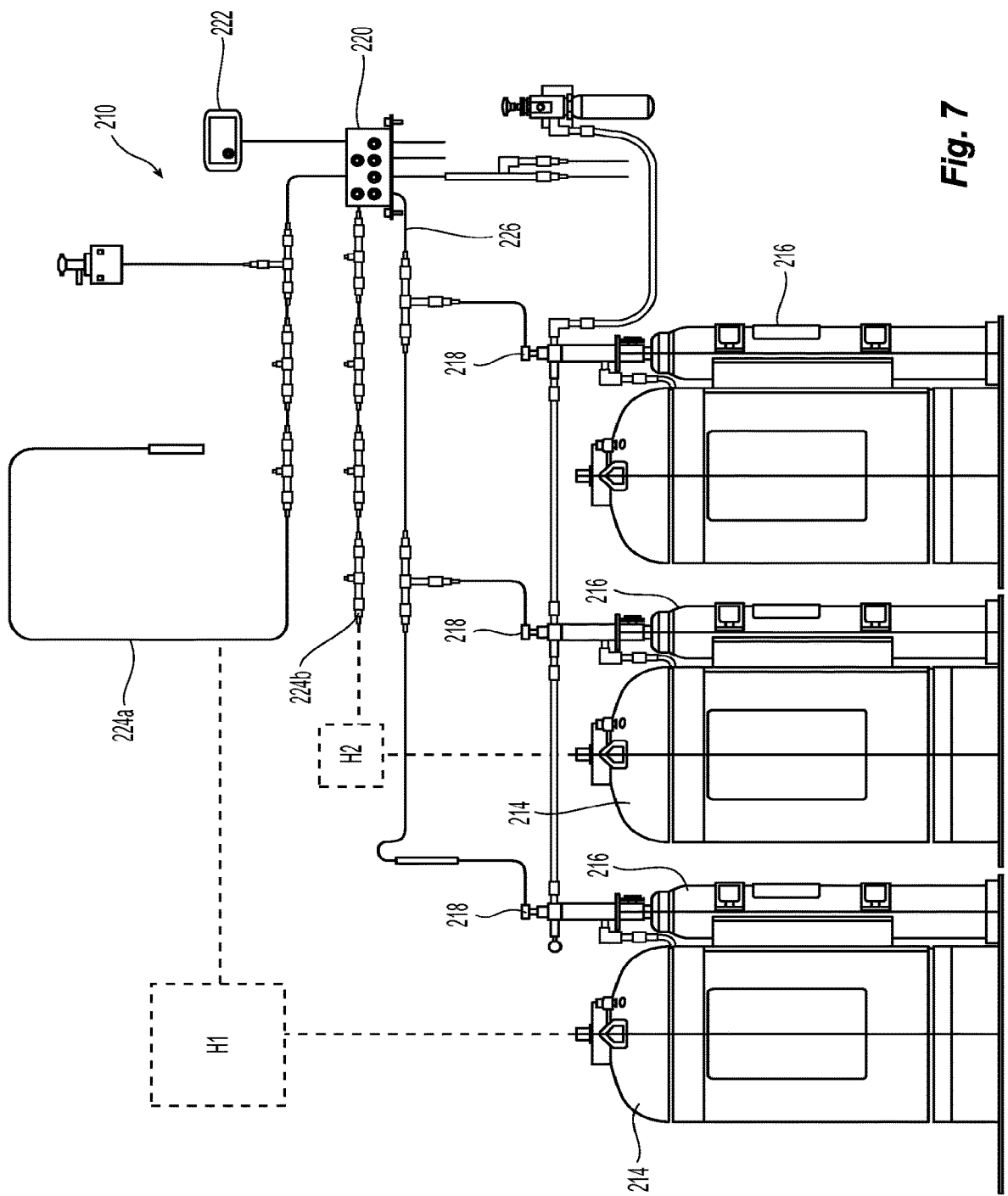
FIG. 7 is a schematic illustration of another embodiment of a fire suppression system having two input buses and one output bus.

Another embodiment of the fire suppression system can be configured with at least two input bus lines which can protect more than one hazard. Shown schematically in FIG. 7 is the system 210 includes a controller 220, an interface display 222, a first input bus 224*a* and at least a second input bus 224*b*, each input bus having a plurality of fire detection devices 232 and manual actuating devices 234. In one aspect of the preferred system 210, the first and second input buses 224*a*, 224*b* are configured for respectively protecting first hazard H1 and at least second hazard H2. In one aspect, first and second hazard can define different zone, areas or occupancies of a vehicle being protected. The system 210 further includes an output bus 226 with a plurality of actuation devices 205, 218 and more preferably a plurality of PADs 218, each coupled to a pressurized cylinder assembly 216 for discharge of a fire fighting agent for protection of the first hazard H1 and at least the second hazard 2. Accordingly, two or more input buses provide one method of configuring the preferred fire suppression system for protecting separate hazards that may have different detection and/or actuation requirements for protection of the individual hazards.

Figure 8:
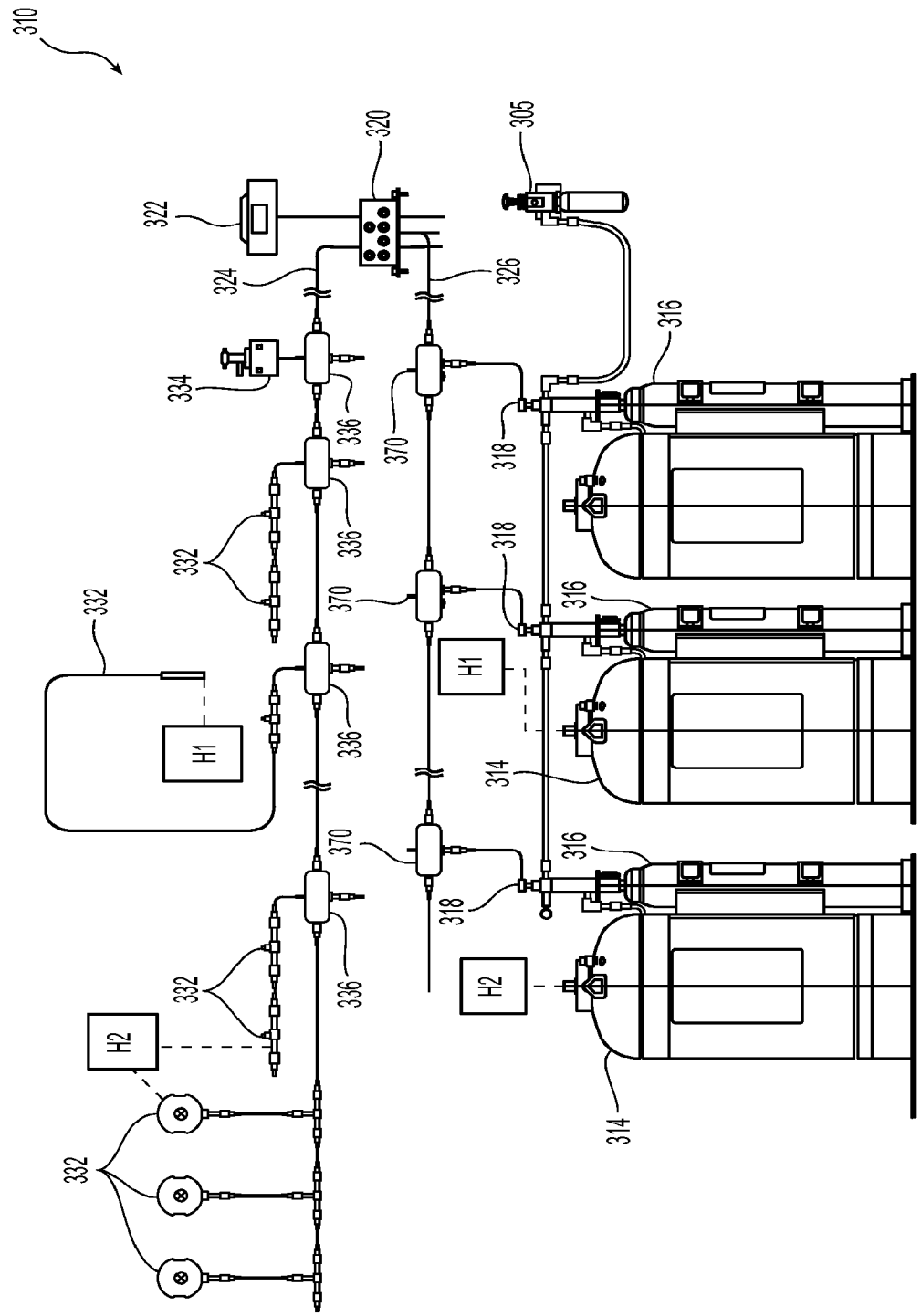
FIG. 8 is a schematic illustration of another embodiment of a fire suppression system using the modules of FIGS. 4 & 5.

Shown schematically in FIG. 8 is another embodiment of fire suppression system 310 that incorporates an input bus 324 and an output bus 326 with each bus respectively including one or more detection and releasing modules as previously described. The system 310 includes a controller or ICM 320, an interface display 322, an input bus 324 having a plurality of detection devices 332 and/or manual actuating devices 334 interconnected by one or more detection modules 336 to the ICM 320. The system 310 further preferably includes with one or more actuation devices 305, 318 and more preferably a plurality of PADs 318 interconnected by one or more of release modules 370 to the ICM 320.

The microprocessors in each of the individual detection modules 336 can be programmed separately to set the detection parameters for the detection device(s) 332 associated with the detection module 336. In another preferred configuration of the suppression system 310, separate detection module and device combinations 336, 332 can be configured or programmed to provide fire detection to different hazards requiring different detection parameters. In another preferred configuration of the suppression system 310, separate detection module and device combinations 336, 332 can be configured or programmed to provide fire detection to different hazards H1, H2 requiring different detection parameters. In another preferred configuration of the suppression system 310, separate release module and actuating device combinations 370, 318 can be configured or programmed to provide fire detection to different hazards H1, H2 requiring different suppression parameters, e.g., actuating sequence or pattern. Accordingly, a preferred fire suppression system 310 with programmable modules 336, 370 provides another arrangement for protection of separate hazards that may have different or variable detection and/or actuation requirements to address a fire in the individual hazards.

In order to configure a preferred fire suppression system for protection of one or more hazards, the system may be programmed. With reference to FIG. 1, the ICM 20 may include an input device, i.e., a toggle switch or alternatively the ICM may be coupled to a separate user interface for program input, such as for example, the one or more accompanying display device 22. Alternatively, the ICM may include wireless communication capabilities, a USB or other port 41, as seen in FIG. 2, for connection to a computer, external media or other input device through which a program, system history, customized settings or firmware may be entered, uploaded or downloaded. In one preferred embodiment, the ICM can be configured to program the detection or actuating devices 32, 34 and or modules 36, 70 respectively disposed on the input and output buses. In another aspect, the ICM 20 may include or be coupled to one or more relay and/or can bus modules 43 for communication with a subsystem of a vehicle, e.g., vehicle electronics using J1939 communication protocol or an engine compartment to begin for example, vehicle shut down in the event of a fire. The relays can be programmed based on the state of the ICM 20, detection module or release module status. Accordingly, exemplary device programming, for example, can set threshold levels, time delays, discharge sequences and patterns, vehicle system parameters and/or other fire suppression system parameters to provide for customized detection and actuation for a particular hazard. Accordingly, customized programming of the detection device can provide for protection of multiple and variable hazards.

Figure 9B:
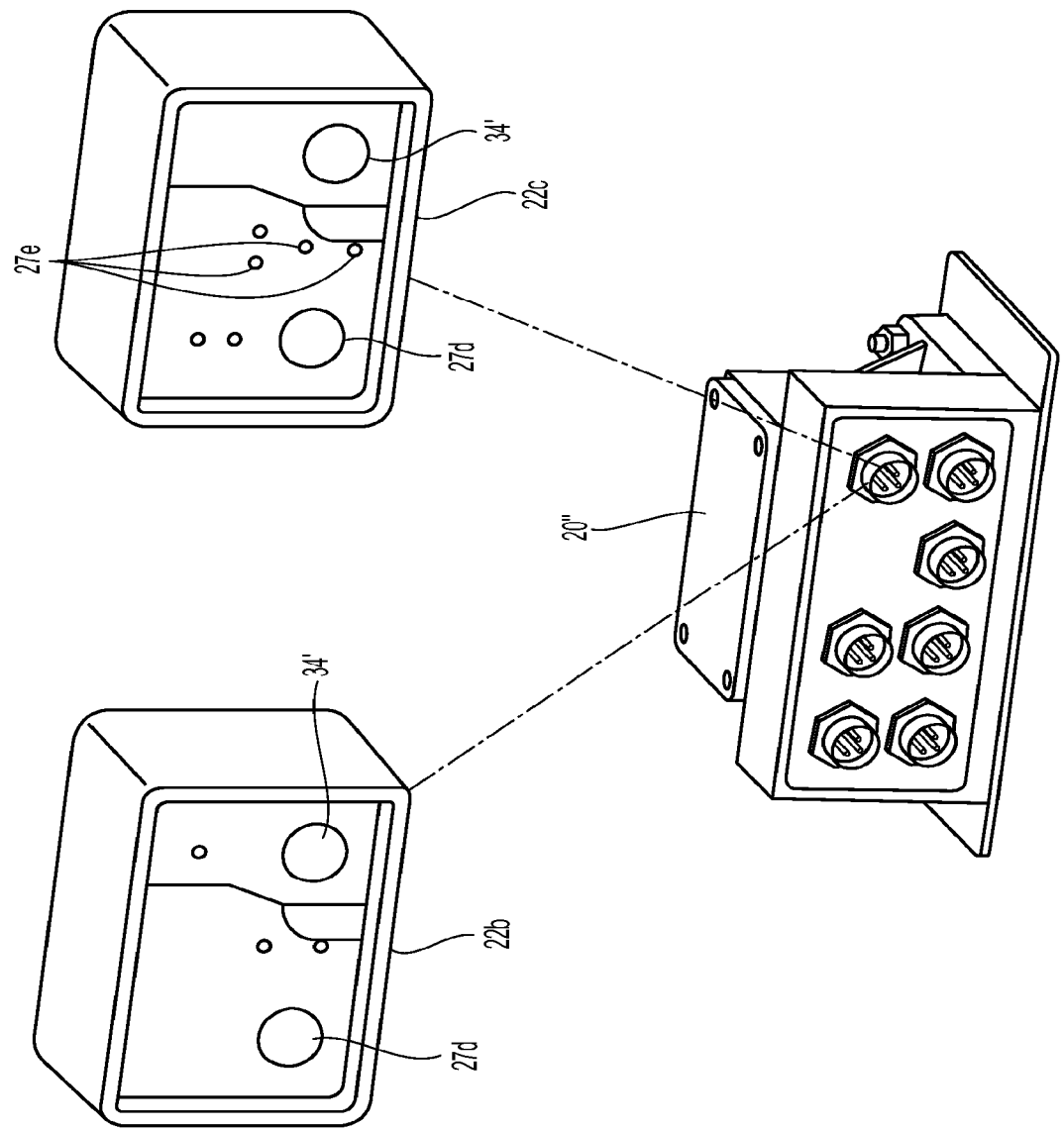
FIG. 9B are alternate interface display devices for use with the systems of FIGS. 6 & 7.

As described, the preferred systems include a display interface to monitor, operate and preferably program the ICM and/or the components, i.e., modules/devices, disposed along the input and output buses. In one particular aspect, the display provides visual indication of the status of the input and output buses including, e.g., indication of: a normal state, ground state, open circuit, manual release. Moreover in another aspect, the preferred display is coupled to the ICM to provide for programming and operational input. For example in the display devices 22a, 22b, 22c of FIGS. 9A and 9B, the display 22a includes visual indicators and/or visual displays 27a that are coupled with user input devices. As shown, the display devices 22a, 22b, 22c can include for example, push buttons 27b, toggle switches, and/or directional buttons 27c in order to scroll, select, edit, reset and/or input, etc. operational parameters of the system and its components. In one particular aspect, the interface display includes a manual actuating button 34' to send an actuating signal to the ICM 20 to relay a corresponding manual actuation signal to the actuation device or PAD 18 on the output bus 26. The interface display further preferably includes a silence button 27d to silence the alarm for a defined period of time, for example, two hours before the alarm re-notifies system personnel of an unresolved issue. In one particular aspect, the visual indicators of the interface display include LEDs 2e which indicate the status of system components using, for example, a binary indicator, i.e., on-off. Alternatively, the LEDs may use a color scheme to indicate the status of a system component, i.e., green— normal status, yellow—fault, red—detection/alarm condition. Shown in FIG. 9C is another embodiment of a LED display 27e in combination with toggle switch 29 which can be used to enable and identify detection devices, time delays and/or power supplies. In addition or alternatively, the interface display 27a of FIG. 9A may use text and/or dynamic or static images to visually indicate the system status. For example, the display may use pictures or icons as the visual indicators.

Figure 9D:
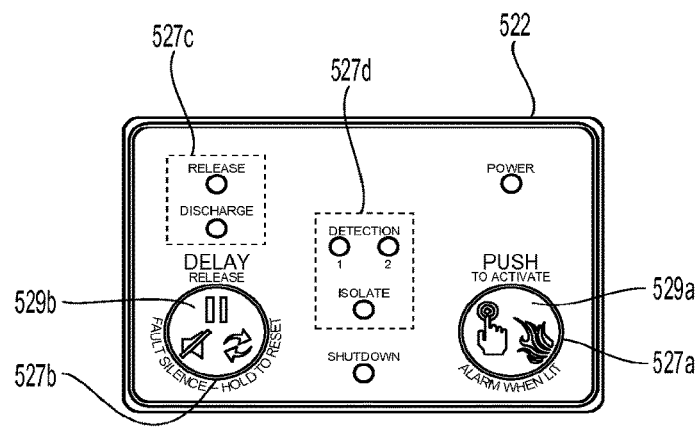
FIG. 9D is a preferred embodiment of the interface display device of FIG. 9B.
Figure 9E:
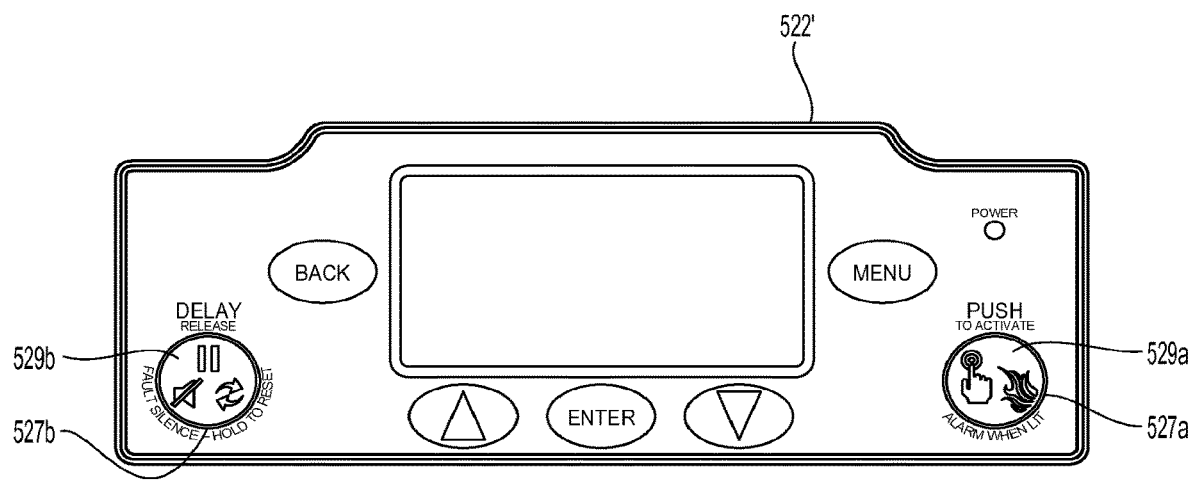
FIG. 9E is a preferred embodiment of the interface display device of FIG. 9A.

Shown in FIGS. 9D and 9E are exemplary embodiments of a user interface display 522, 522' having two push button toggle switches 529a, 529b in which each push of the button enables or programs a different function depending on the status of the system. In a preferred embodiment, the first button 529a is preferably configured for manual actuation of one or more of the pressurized cylinder assemblies 16 for the delivery of firefighting agent from the storage tanks 14. Thus, a push of first button 529 preferably immediately triggers the releasing circuit of the system for the preferred instantaneous discharge of firefighting agent into the hazard area being protected. Accordingly, the first button 529a is shown as labeled with "PUSH To Activate." The first button 529a further preferably includes an LED visual indicator 527a which flashes on, pulses or blinks for a particular duration and/or frequency to indicate system status. For example, following a manual actuation by push of the first button 529, the LED indicator 527a is configured to indicate the system is in a post-release or post-discharge state by preferably pulsing at a frequency of one pulse per every ten seconds or other defined frequency.

When a fire detection device 32 communicates with the ICM 20 signaling detection of a fire, the LED indicator 527a is preferably configured with the ICM 20 to pulse to visually indicate a vehicle or system operator detection of a fire and countdown of a period of time from detection to agent release, i.e., a release time delay. In one preferred embodiment, the LED indicator 527a can be configured to pulse at a first frequency for a first portion of the release time delay and a second frequency for a second portion of the time delay thereby indicating an alarm condition of the system. For example, the LED indicator 527a can pulse at a rate of two times per second for the first portion of the time delay until, for example, the remaining or second portion of the time delay is five seconds until automated release. Over the second portion of the time delay, e.g., the final five seconds, the LED indicator 527a pulses, for example, at four times per second. At the expiration of the time delay, the releasing circuit actuates for agent release, the LED indicator 527a can indicate system release by remaining steadily on for a period of time such as for example, ten seconds. Following agent release, the LED indicator 527a indicates a post-discharge mode by pulsing at the corresponding frequency, e.g., pulsing once every ten seconds. Accordingly, the LED indicator 527a provides a visual indicator of the various states of the system, e.g., alarm or fire detection condition, discharge condition, and post-discharge condition. As previously described, the system can include an alarm or speaker 23 coupled to the ICM controller 20, to provide an audible signal or indicator of system status. Preferably, the audible signal pulses at same frequency of the pulse of the LED indicator 527a to provide an audible signal of the corresponding system status.

Once the release time delay sequence is initiated following a fire detection signal from any one of a fire detection device 32, the second push button toggle switch 529b is preferably configured to restart the release time delay. As a restart of the release time delay, depressing the second push button 529b restarts the countdown to release thereby providing additional time prior to release and more preferably a range between 5 to 15 additional seconds before release. The controller 20 can be configured to permit a limited number of resets of the time delay. Alternatively, the system can be configured to provide for an infinite number of resets of the time delay. A push of the second toggle button 529b can also be preferably configured to silence the alarm 23 following a fault condition. Accordingly, the second button 529b is shown with "FAULT SILENCE-HOLD TO RESET". The second push button toggle switch 529b is further preferably configured to program or set the controller and the releasing circuit with the release time delay. Thus as shown, the second push button 529b is labeled "DELAY RELEASE". The second button 529b places the system in a preferred programming or isolated condition before programming or setting a time delay or other maintenance to the control system. In one preferred aspect, depressing and holding the second push button 529b for a period of time, such as for example 10 seconds, to at least partially isolate the ICM 20 from the release circuit such that the detection circuit cannot initiate a release but permit manual actuation of the releasing circuit and continued monitoring along the detection circuit. In one preferred aspect, the second push button 529*b* defines, sets or programs the release time delay by the duration at which the button 529*b* is depressed. Once the ICM 20 is in an isolated condition, continued depression and holding down of the second button 529*b* for a duration of time preferably programs the release time delay. The duration of the release time delay is preferably indicated by the number of pulses of a second LED indication 527*b* associated with the second push button 529*b*. For example, depressing the second push button 529*b* such that the second LED indicator 527*b* pulses three times programs the release time delay for five seconds and depressing the second push button 529*b* such that the second LED indicator 527*b* pulses five times for fifteen second delay. Accordingly, the release delay time can be programmed for any increment or duration of time and moreover be indicated by LED indicator or other indicator to represent the intervals of time delay to agent release. Once the release time delay is set, the second push button 529 can be depressed and held down to place the ICM 20 in a normal condition. As shown in FIGS. 9D and 9E, the LED indicators 527*a*, 527*b* can be a part of or incorporated with the associated push button 529*a*, 529*b* of the user interface 522, 522'. Alternatively or in addition to, the user interface, as seen for example in FIG. 9D, can includes additional LED indicators 527*c*, 527*d* to indicate extinguishment release or discharge or system status, e.g., detection condition or isolated condition.

Figure 10C:
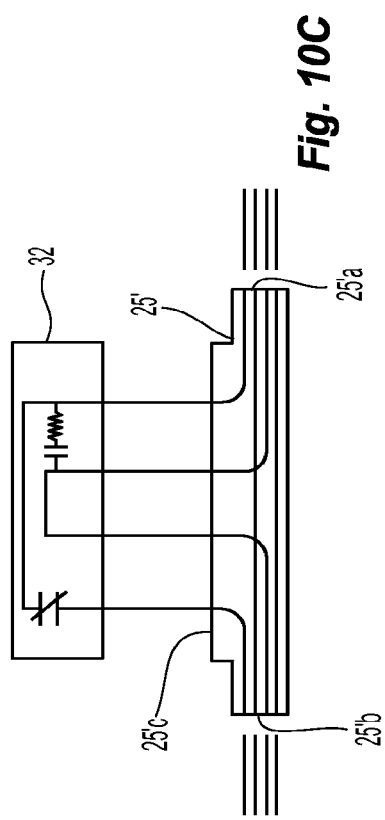

As described, the components and more particularly the devices of the input bus are preferably interconnected by wire or cable and connectors 25, as seen for example, in FIG. 1. In one particular system embodiment, the connection cable carries control, power, data and/or sensing signals between the detection devices and the ICM. A preferred connector 25' is provided for interconnecting segments of the connection cable so as to define a main bus of power for use by the devices of the input bus. One particular embodiment of a connector 25' is substantially T-shaped having a first end 25'*a*, a second end 25'*b* and an intermediate connector end 25'*c* extending between the first and second end. The preferred connector includes at least one, and more preferably four internal wire(s), which extend from the first end 25'*a* to the intermediate connector 25'*c* and to the second end 25'*b*. With the first end 25'*a* of the connector coupled to an electrical signal defining an operating voltage, the internal wire of the preferred connector 25' has the same voltage at each of its first 25'*a*, second 25'*b* and intermediate ends 25'*c*. Accordingly, connection wire coupled to the second end 25'*b* of the preferred connector 25' receive, the same input voltage as is provided at the first end 25'*a* of the connector. In the exemplary embodiments of FIGS. 10A-10C, a device, such as for example, a sensing device 32 may engage the intermediate connection end 25'*c* such that the device 32 receives the signal at the same voltage that is provided at the first end 25'*a* of the connector 25'. The preferred connector 25' therefore provides main bus voltage along the length of the input bus.

Figure 11:
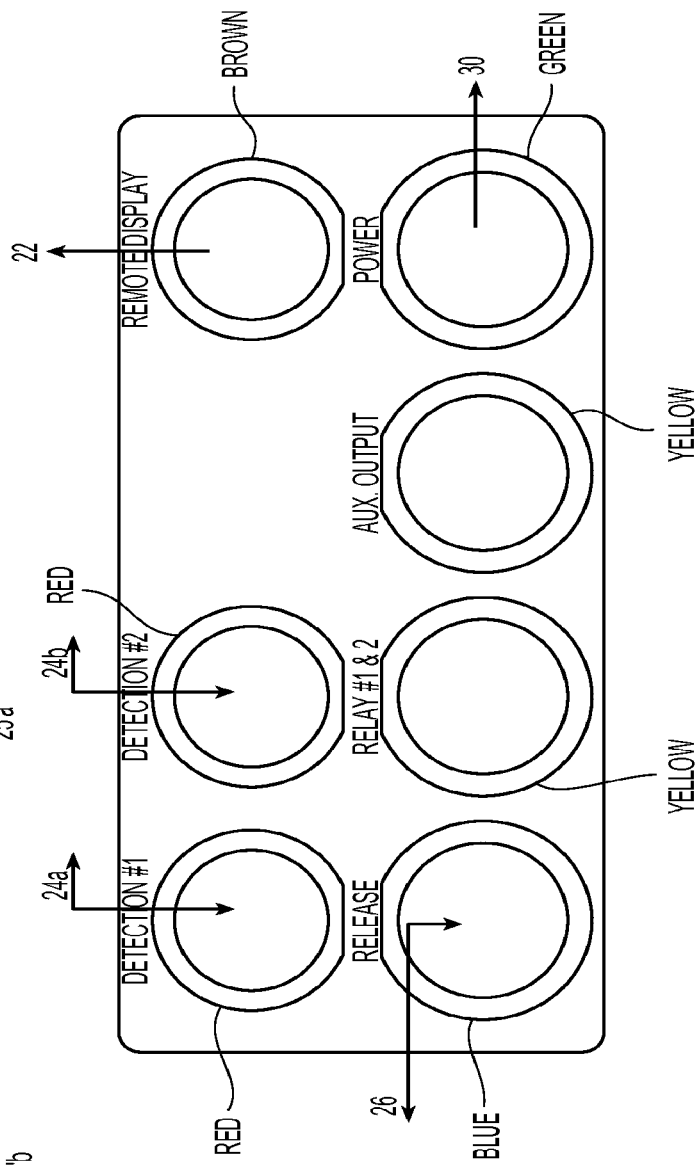
FIG. 11 is a preferred embodiment of a terminal connector of a controller used in the system of FIG. 7.

In yet another aspect of the system connections, a color scheme is employed to facilitate proper interconnection between system components. For example as seen in FIG. 11, the ICM 20 may include connection ports to the various buses, i.e., input bus 24, output bus 26, power supply bus, etc. for engaging one or more connection cables to the input, output bus and/or power supplies. The ICM 20 may include a colored coded face plate to insure proper connection of the connection cables having terminal connectors at their ends which may include correspondingly or similarly colored plastic overlays connectors for engaging the end of the connection cable. The use of one or more color schemes facilitates installation of the system. Moreover, the connection cables of a preferred suppression systems can be jacketed within a harness that distinguishes it from other cables to prevent tampering or accidental disconnection. For example, the connection system of the cables can be jacketed in a red harness.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A vehicle fire suppression system comprising:
   a centralized controller;
   a fire detection circuit coupled to the centralized controller and configured to indicate a detection of a fire;
   a releasing circuit including an actuating device configured to release an extinguishment to address the fire, wherein the releasing circuit is coupled to the centralized controller, wherein the centralized controller is configured to control the actuating device to initiate a release of the extinguishment in response to the detection of the fire by the fire detection circuit; and
   a user interface device coupled to the centralized controller and configured to program the centralized controller to define a release time delay defining a time duration between the detection of the fire by the fire detection circuit and the release of the extinguishment, wherein the user interface device includes a visual indicator configured to provide a first visual indication throughout a first portion of the release time delay and configured to provide a second visual indication throughout a second portion of the release time delay.

2. The system of claim 1, wherein visual indicator is configured to pulse at a first frequency for the first portion of the release time delay, and wherein the visual indicator is configured to pulse at a second frequency different than the first frequency for the second portion of the release time delay.

3. The system of claim 2, wherein the visual indicator is an LED indicator.

4. The system of claim 2, wherein the user interface device further includes an input device configured to reset the release time delay following the detection of the fire by the fire detection circuit.

5. The system of claim 4, wherein the release time delay can be reset a limited number of times following the detection of the fire by the fire detection circuit.

6. The system of claim 5, wherein the input device is a button.

7. A vehicle fire suppression system comprising:
   a centralized controller;
   a fire detection circuit coupled to the centralized controller and configured to indicate a detection of a fire;
   a releasing circuit including an actuating device configured to release an extinguishment to address the fire, wherein the releasing circuit is coupled to the centralized controller, wherein the centralized controller is configured to control the actuating device to initiate a release of the extinguishment in response to the detection of the fire by the fire detection circuit; and a user interface device coupled to the centralized controller and configured to program the centralized controller to define a release time delay defining a time duration between the detection of the fire by the fire detection circuit and the release of the extinguishment, wherein the user interface device further includes an input device configured to reset the release time delay following the detection of the fire by the fire detection circuit.

8. The system of claim 7, wherein the release time delay can be reset a limited number of times following the detection of the fire by the fire detection circuit.

9. The system of claim 8, further comprising an alarm coupled to the centralized controller for providing an audio signal indicating a status of the system along at least one of the fire detection circuit and the releasing circuit, wherein the input device is further configured to silence the audio signal of the alarm.

10. The system of claim 9, wherein the input device is a button.

11. A vehicle fire suppression system comprising:
a centralized controller;
a fire detection circuit coupled to the centralized controller and configured to indicate a detection of a fire;
a releasing circuit including an actuating device configured to release an extinguishment to address the fire, wherein the releasing circuit is coupled to the centralized controller, wherein the centralized controller is configured to control the actuating device to initiate a release of the extinguishment in response to the detection of the fire by the fire detection circuit;
an alarm coupled to the centralized controller for providing an audio signal indicating a status of the system along at least one of the fire detection circuit and the releasing circuit; and
a user interface device coupled to the centralized controller, wherein the user interface device includes a manual actuating button for sending a manual actuating signal to the actuating device and a silence button for the audio signal.

12. The system of claim 11, wherein the user interface device is configured to program the centralized controller to define a release time delay defining a time duration between the detection of the fire by the fire detection circuit and the release of the extinguishment.

13. The system of claim 11, wherein the user interface device includes a first LED indicator configured to indicate a manual release condition.

14. The system of claim 13, wherein the user interface device includes a second LED indicator configured to indicate the detection of the fire by the fire detection circuit.

15. The system of claim 13, wherein the user interface device includes a second LED indicator, and wherein the second LED indicator in combination with the silence button programs the centralized controller to define a sequence of release of extinguishment following an alarm condition.

16. The system of claim 15, wherein the silence button is configured to reset the centralized controller after one of the alarm condition and a release condition.

17. The system of claim 16, wherein the silence button is configured to isolate the centralized controller from the fire detection circuit for programming the centralized controller.

18. The system of claim 17, wherein the silence button is configured to program the centralized controller to set a release time delay defining a time duration between the detection of the fire by the fire detection circuit and the release of the extinguishment.

19. The system of claim 18, wherein the release time delay is defined by a duration of time the silence button is depressed and held down.

20. The system of claim 19, wherein the second LED indicator pulses corresponding to the duration of time the silence button is depressed and held down, the second LED indicator pulsing a first number of pulses to define a first release time delay and pulsing a second number of pulses to define a second release time delay different than the first release time delay.

* * * * *